United States Patent
Shiodera et al.

(10) Patent No.: US 11,303,917 B2
(45) Date of Patent: *Apr. 12, 2022

(54) IMAGE ENCODING AND DECODING METHOD WITH A MERGE FLAG AND MOTION VECTORS

(71) Applicant: KABUSHIKI KAISHA TOSHIBA, Minato-ku (JP)

(72) Inventors: Taichiro Shiodera, Tokyo (JP); Akiyuki Tanizawa, Kawasaki (JP); Tomoo Yamakage, Yokohama (JP); Takeshi Chujoh, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/039,277

(22) Filed: Sep. 30, 2020

(65) Prior Publication Data

US 2021/0021851 A1 Jan. 21, 2021

Related U.S. Application Data

(63) Continuation of application No. 16/665,103, filed on Oct. 28, 2019, now Pat. No. 10,841,606, which is a
(Continued)

(51) Int. Cl.
*H04N 7/12* (2006.01)
*H04N 19/51* (2014.01)
(Continued)

(52) U.S. Cl.
CPC .......... *H04N 19/51* (2014.11); *H04N 19/428* (2014.11); *H04N 19/52* (2014.11)

(58) Field of Classification Search
CPC ...... H04N 19/51; H04N 19/428; H04N 19/52; H04N 19/176; H04N 19/50
See application file for complete search history.

(56) References Cited

U.S. PATENT DOCUMENTS

| | | |
|---|---|---|
| 5,337,086 A | 8/1994 | Fujinami |
| 6,058,212 A | 5/2000 | Yokoyama |
| (Continued) | | |

FOREIGN PATENT DOCUMENTS

| | | |
|---|---|---|
| CN | 1078795 C | 1/2002 |
| CN | 1977541 A | 6/2007 |
| (Continued) | | |

OTHER PUBLICATIONS

J. Lin, Y. Tsai, Y. Huang and S. Lei, "Improved Advanced Motion Vector Prediction", Joint Collaborative Team on Video Coding (JCT-VC), Jan. 20-28, 2011.
(Continued)

*Primary Examiner* — Richard T Torrente
(74) *Attorney, Agent, or Firm* — Oblon, McClelland, Maier & Neustadt, L.L.P.

(57) ABSTRACT

A method of dividing an input image signal into pixel blocks, and performing inter-prediction on the divided pixel blocks. This method includes selecting predicted motion information from a motion information buffer storing motion information in an encoded region, and predicting motion information of an encoding target block by using the predicted motion information. The method further includes acquiring representative motion information from a plurality of items of motion information in an encoded region in accordance with first information indicating a method of selecting the predicted motion information, thereby obtaining only the representative motion information.

2 Claims, 32 Drawing Sheets

Related U.S. Application Data continuation of application No. 15/864,468, filed on Jan. 8, 2018, now Pat. No. 10,511,851, which is a continuation of application No. 14/021,357, filed on Sep. 9, 2013, now Pat. No. 9,900,594, which is a continuation of application No. PCT/JP2011/055504, filed on Mar. 9, 2011.

(51) Int. Cl.
*H04N 19/426* (2014.01)
*H04N 19/52* (2014.01)

(56) References Cited

U.S. PATENT DOCUMENTS

| | | | |
|---|---|---|---|
| 7,233,621 B2 | 6/2007 | Jeon | |
| 7,558,428 B2 | 7/2009 | Shen et al. | |
| 8,462,853 B2* | 6/2013 | Jeon | G06F 1/00 375/240.16 |
| 2004/0013308 A1 | 1/2004 | Jeon et al. | |
| 2006/0002474 A1 | 1/2006 | Au | |
| 2006/0262981 A1 | 11/2006 | Jeon et al. | |
| 2008/0037642 A1 | 2/2008 | Tsuchiya et al. | |
| 2008/0187052 A1* | 8/2008 | Terada | H04N 19/115 375/240.24 |
| 2008/0267292 A1 | 10/2008 | Ito et al. | |
| 2009/0067498 A1 | 3/2009 | Jeon | |
| 2011/0038420 A1 | 2/2011 | Lee et al. | |
| 2011/0158320 A1 | 6/2011 | Zheng et al. | |
| 2012/0020580 A1 | 1/2012 | Sasai et al. | |
| 2012/0075535 A1 | 3/2012 | Van Beek | |
| 2012/0147966 A1 | 6/2012 | Lee et al. | |
| 2012/0281764 A1 | 11/2012 | Lee et al. | |
| 2013/0058415 A1 | 3/2013 | Lee et al. | |
| 2013/0279593 A1 | 10/2013 | Lee et al. | |
| 2013/0279594 A1 | 10/2013 | Lee et al. | |
| 2013/0301736 A1* | 11/2013 | Sugio | H04N 19/137 375/240.16 |
| 2013/0315571 A1 | 11/2013 | Park et al. | |
| 2014/0010309 A1 | 1/2014 | Shiodera et al. | |
| 2014/0016705 A1 | 1/2014 | Lee et al. | |

FOREIGN PATENT DOCUMENTS

| | | |
|---|---|---|
| CN | 101917627 A | 12/2010 |
| EP | 2 675 168 A2 | 12/2013 |
| JP | 7-131792 | 5/1995 |
| JP | 9-9135 A | 1/1997 |
| JP | 3263960 B2 | 3/2002 |
| JP | 2004-56756 | 2/2004 |
| JP | 2004-129191 | 4/2004 |
| JP | 2007-525100 | 8/2007 |
| JP | 4020789 | 10/2007 |
| JP | 2008-278091 | 11/2008 |
| JP | 2008-283490 | 11/2008 |
| JP | 2012-186759 | 9/2012 |
| JP | 2012-186760 | 9/2012 |
| JP | 2013-9302 | 1/2013 |
| JP | 5563148 B2 | 7/2014 |
| RU | 2310290 C2 | 11/2007 |
| WO | 2009/051419 | 4/2009 |
| WO | WO 2010/027457 A1 | 3/2010 |
| WO | WO 2010/087157 A1 | 8/2010 |
| WO | WO 2011/019247 A2 | 2/2011 |
| WO | WO 2012/108701 A2 | 8/2012 |
| WO | WO 2012/119776 A1 | 9/2012 |

OTHER PUBLICATIONS

Search and Examination Report dated Dec. 12, 2014 in the corresponding Singapore Patent Application No. 2013065081.

Decision of Patent dated May 20, 2015 in Korean Patent Application No. 10-2013-7020349 (with English language translation).
Decision of Patent dated May 21, 2015 in Korean Patent Application No. 10-2015-7004872 (with English language translation).
Combined Office Action and Search Report dated Aug. 14, 2015 in Malaysia Patent Application No. PI 2013701528.
European Office Action dated Aug. 4, 2015 in Patent Application No. 11 860 461.0.
Korean Office Action dated Nov. 27, 2014, in Korea Patent Application No. 10-2013-7020349 (with English translation).
Office Action dated Dec. 5, 2014 in Australian Patent Application No. 2011361644.
The Extended European Search Report dated Jul. 30, 2014, in Application No. / Patent No. 11860461.0-1907 / 2685717.
Thomas Wiegand, et al., "High Efficiency Video Coding", WD1: Working Draft 1, JCTVC-C403, Joint collaborative Team on Video Coding (JCT-VC) of ITU-T SG16 WP3 and ISO/IEC JTC1/SC29/WG11, XP030008032, Oct. 2010, 138 pages.
Yeping Su, et al., "On Motion vector competition", Sharp, JCTVC-C257, WG11 No. m18298, Joint collaborative Team on Video Coding (JCT-VC) of ITU-T SG16 WP3 and ISO/IEC JTC1/SC29/WG11, XP030046888, Oct. 2010, 2 pages.
Office Action dated Jan. 28, 2014 in Japanese Application No. 2013-503291 (With English Translation).
Singapore Office Action dated Sep. 16, 2016 in Singapore Patent Application No. 10201601243U (English translation only).
Taichiro Shiodera et al., "Modified motion vector memory compression", Joint collaborative Team on Video Coding (JCT-VC) of ITU-T SG16WP3 and ISO/IEC JTC1/SC29/WG11, 5$^{th}$ Meeting: Geneva, CH, Mar. 2011, JCTVC-E211_rl, pp. 1-7.
Edouard Francois, et al., On memory compression for motion vector prediction, Joint Collaborative Team on Video Coding (JCT-VC_ of ITU-T SG16 WP3 and ISO/IEC JTC1/SC29/WG11, 5$^{th}$ Meeting: Geneva, CH, Mar. 2011, JCTVC-E211 _rl, pp. 1-11.
Notice of Allowance dated Dec. 8, 2016 in Russian Patent Application No. 2015146910/08 (with English translation).
International Search Report dated Jun. 7, 2011 for PCT/JP2011/055504 filed on Mar. 9, 2011 with English Translation.
International Written Opinion dated Jun. 7, 2011 for PCT/JP2011/055504 filed on Mar. 9, 2011.
Jung et al.; "Temporal MV predictor modification for MV-Comp, Skip, Direct and Merge schemes"; Joint Collaborative Team on Video Coding (JCT-VC) of ITU-T SG16 WP3 and ISO/IEC JTC1/SC29/WG11 Document, JCTVC-D164, Jan. 2011.
Yeping Su et al.; "CE9: Reduced resolution storage of motion vector data"; Joint Collaborative Team on Video Coding (JCT-VC) of ITU-T SG16 WP3 and ISO/IEC JTC1/SC29/WG11 Document, JCTVC-D072, Jan. 2011.
Bross, B. "CE9: Motion Vector Coding Test Report by Fraunhofer HHI", Joint Collaborative Team on Video Coding (JCT-VC) of ITU-T SG16 WP3 and ISO/IEC JTC1/SC29/WG11, Document: JCTVC-D314_, Jan. 20-28, 2011, pp. 1-10.
Jung, J. et al., "CE9: Summary report for CE9 on motion vector coding", Joint Collaborative Team on Video Coding (JCT-VC) of ITU-T SG16 WP3 and ISO/IEC JTC1/SC29/WG11, Document: JCTVC-D149, Jan. 20-28, 2011, pp. 1-6.
Chujoh, T. et al., "Description of video coding technology proposal by Toshiba", Joint Collaborative Team on Video Coding (JCT-VC) of ITU-T SG16 WP3 and ISO/IEC JTC1/SC29/WG11, Document: JCTVC-A117R1, Apr. 15-23, 2010, pp. 1-6.
Fujibayashi, A. et al., "CE9 3.2d Simplified Motion vector prediction", Joint Collaborative Team on Video Coding (JCT-VC) of ITU-T SG16 WP3 and ISO/IEC JTC1/SC29/WG11, Document: JCTVC-D231, Jan. 20-28, 2011, pp. 1-5.
Jian-Liang Lin, et al., "Motion Vector Coding in the HEVC Standard," IEEE Journal of Selected Topics in Signal Processing, vol. 7, No. 6, Dec. 2013, pp. 957-968.

* cited by examiner

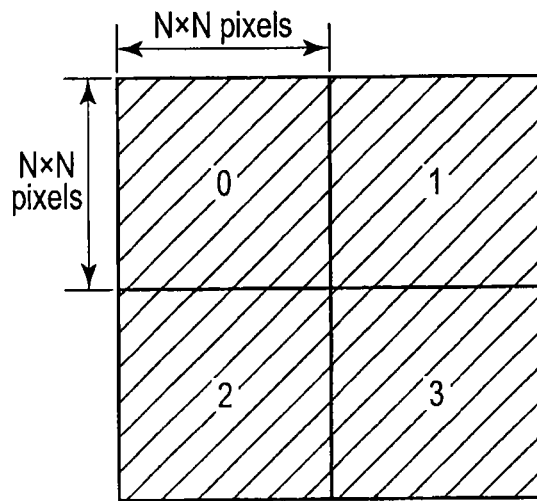
F I G. 3B
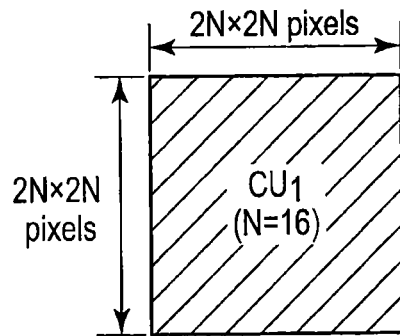
F I G. 3C
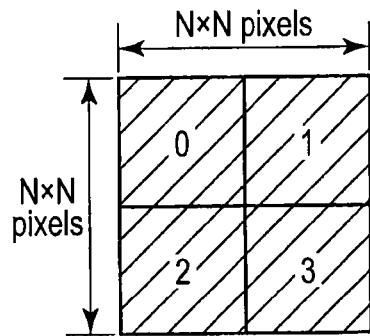
F I G. 3D

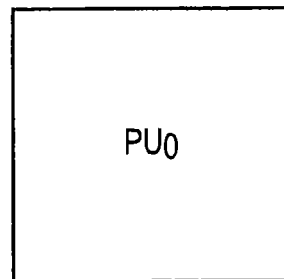
F I G. 7A
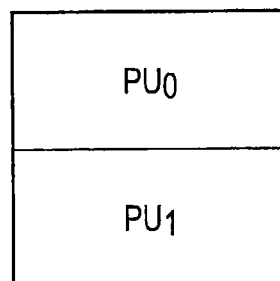
F I G. 7B
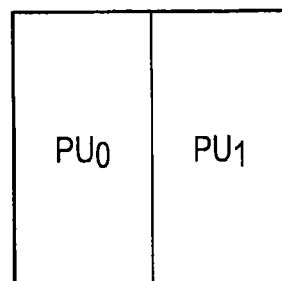
F I G. 7C

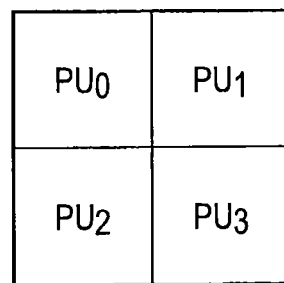
F I G. 7D
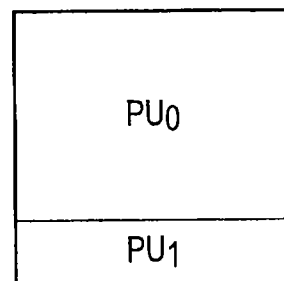
F I G. 7E
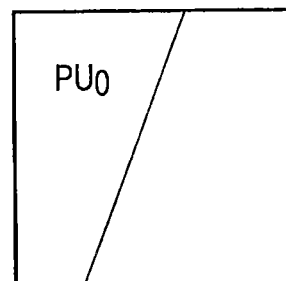
F I G. 7F

| | Predicted motion information position encoding | Differential motion information encoding | Transform coefficient encoding |
|---|---|---|---|
| Skip mode | Included | Not included | Not included |
| Merge mode | Included | Not included | Included |
| Inter mode | Included | Included | Included |

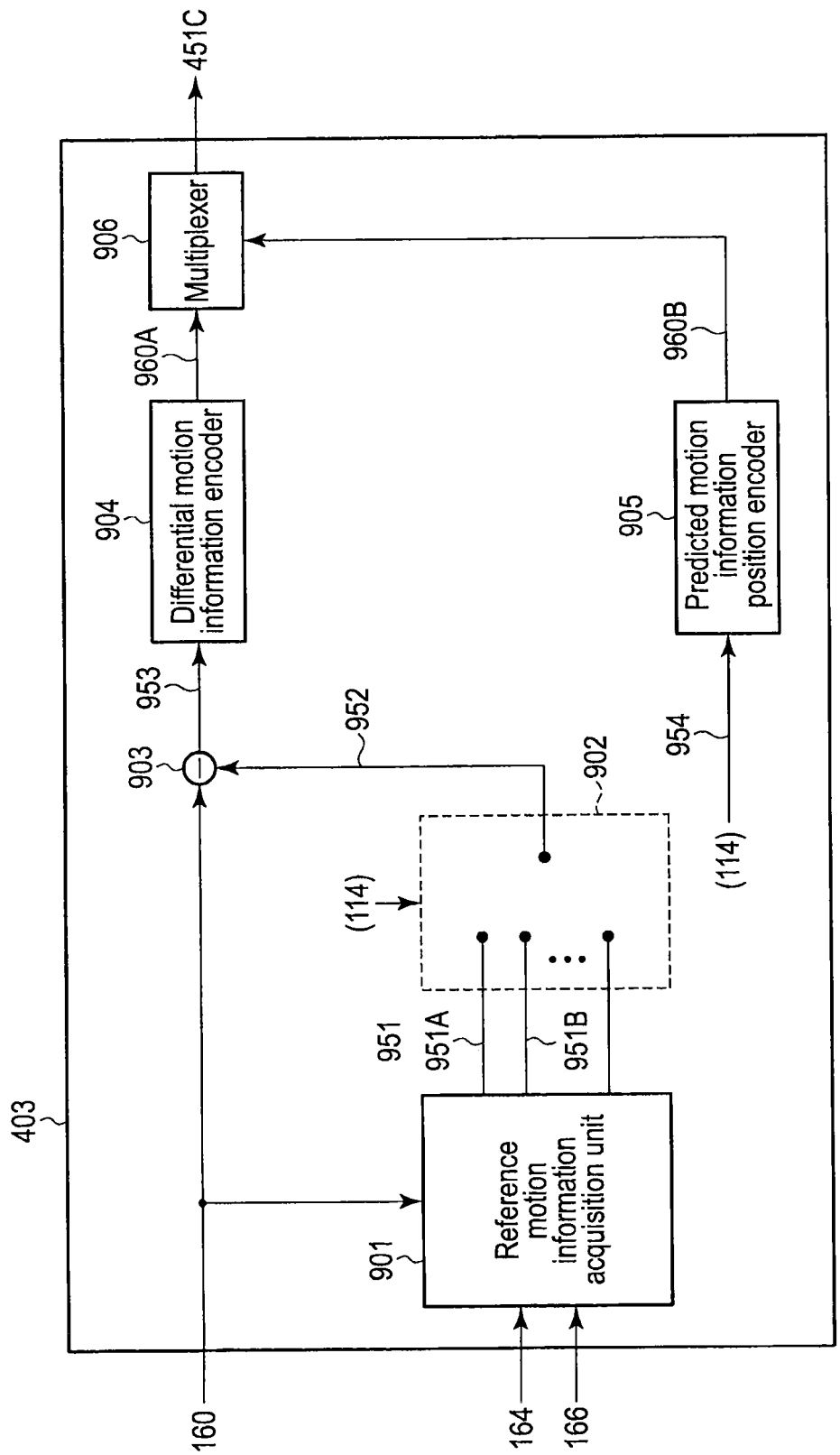
F I G. 9

| Mvpidx | Block position |
|--------|----------------|
| 0 | A |
| 1 | B |
| 2 | C |
| 3 | Col |
F I G. 12
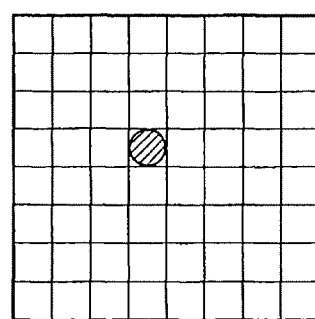
F I G. 13A
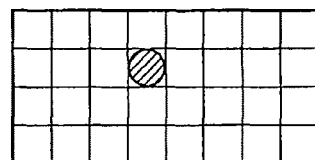
F I G. 13B 16x32
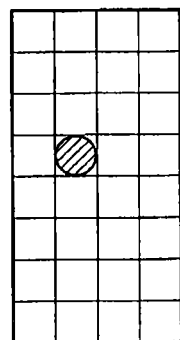
F I G. 13C
16x16
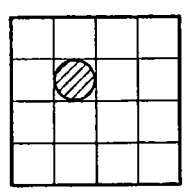
F I G. 13D
16x8
F I G. 13E
8x16
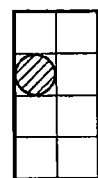
F I G. 13F 16x16
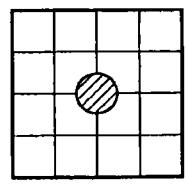
F I G. 14D
16x8
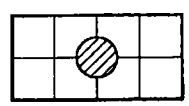
F I G. 14E
8x16
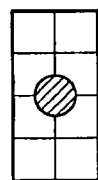
F I G. 14F

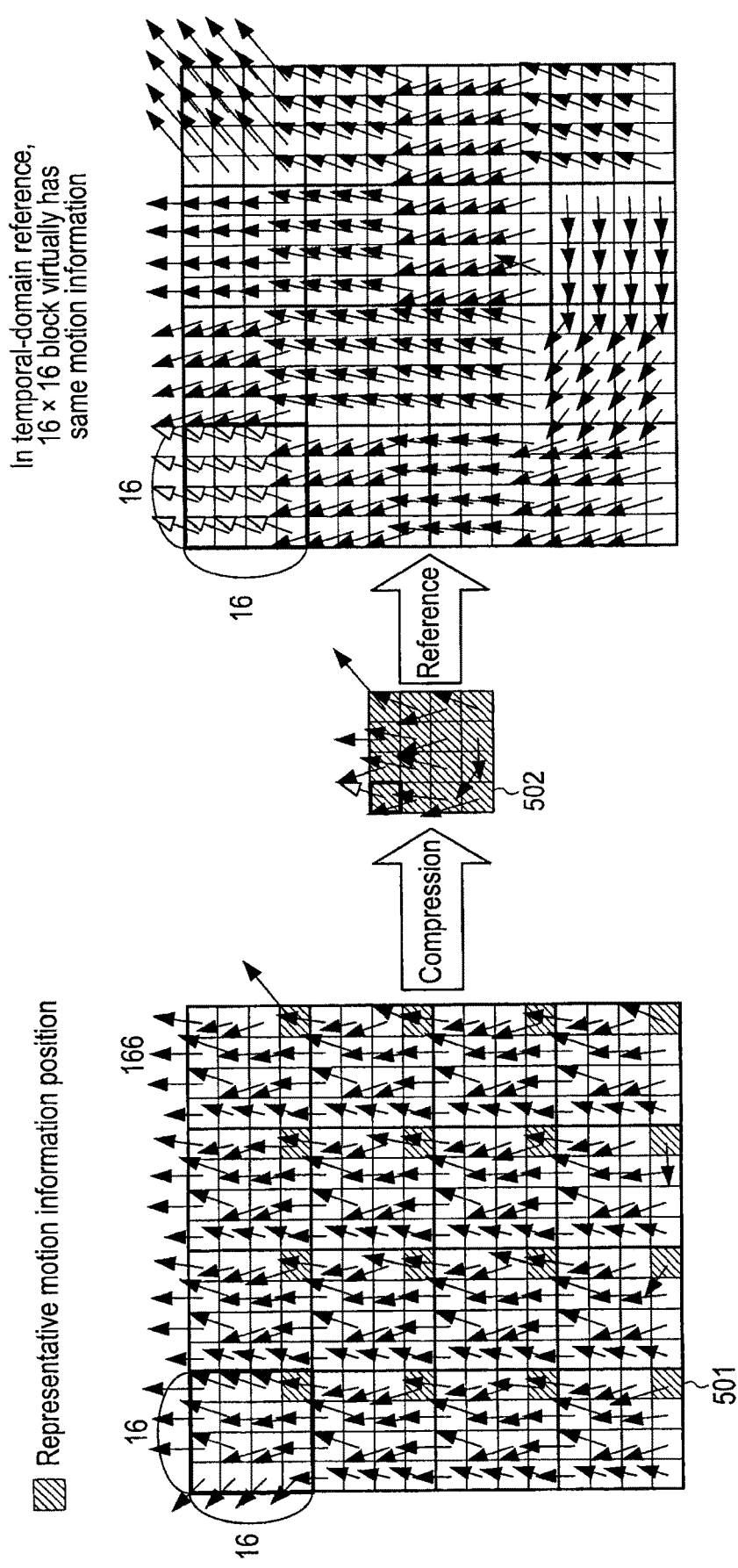
F I G. 15

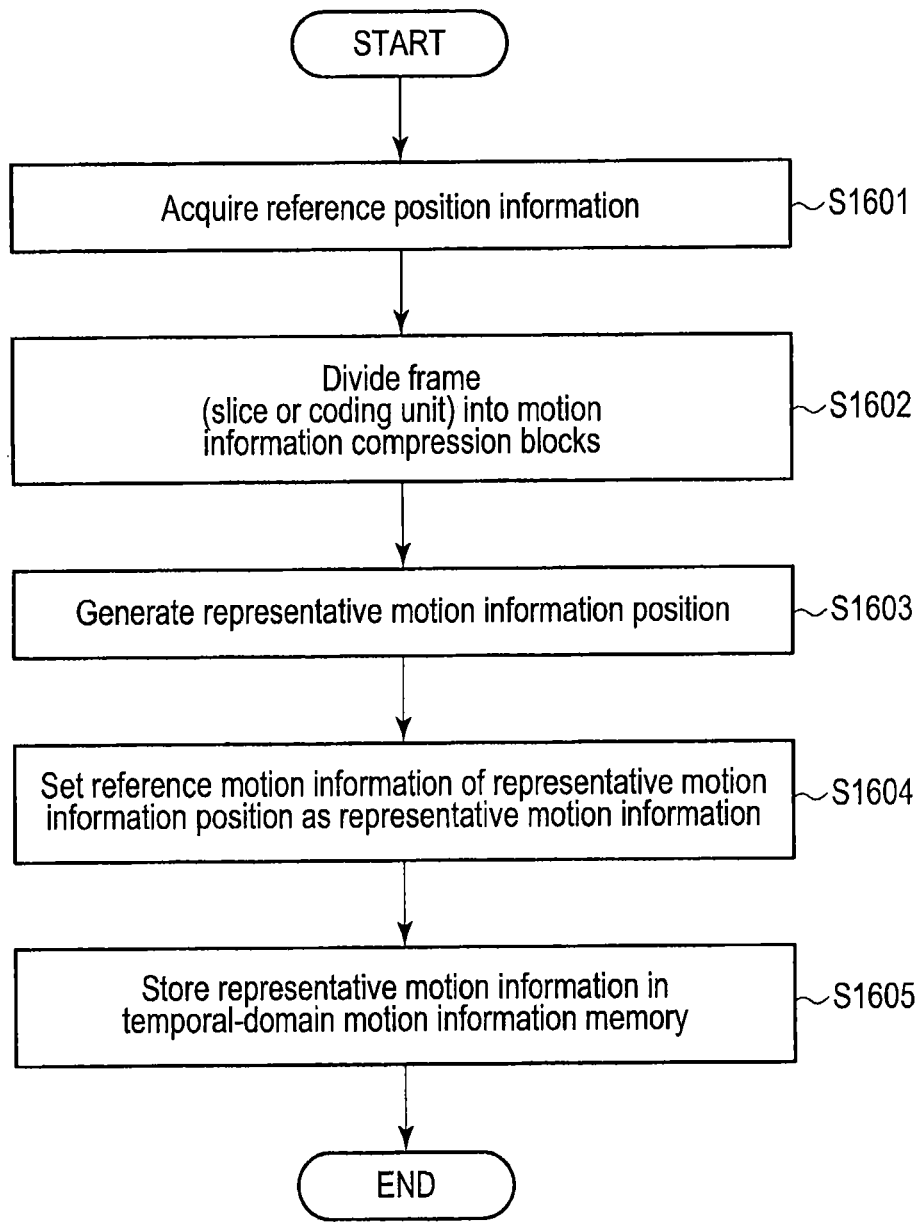
F I G. 16

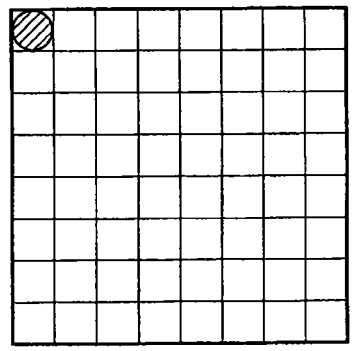
F I G. 17A
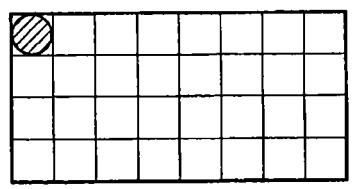
F I G. 17B
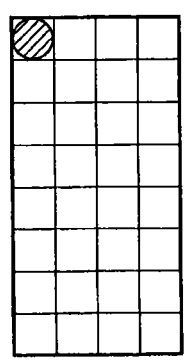
F I G. 17C

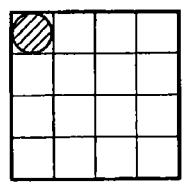
F I G. 17D
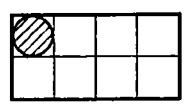
F I G. 17E
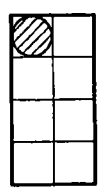
F I G. 17F

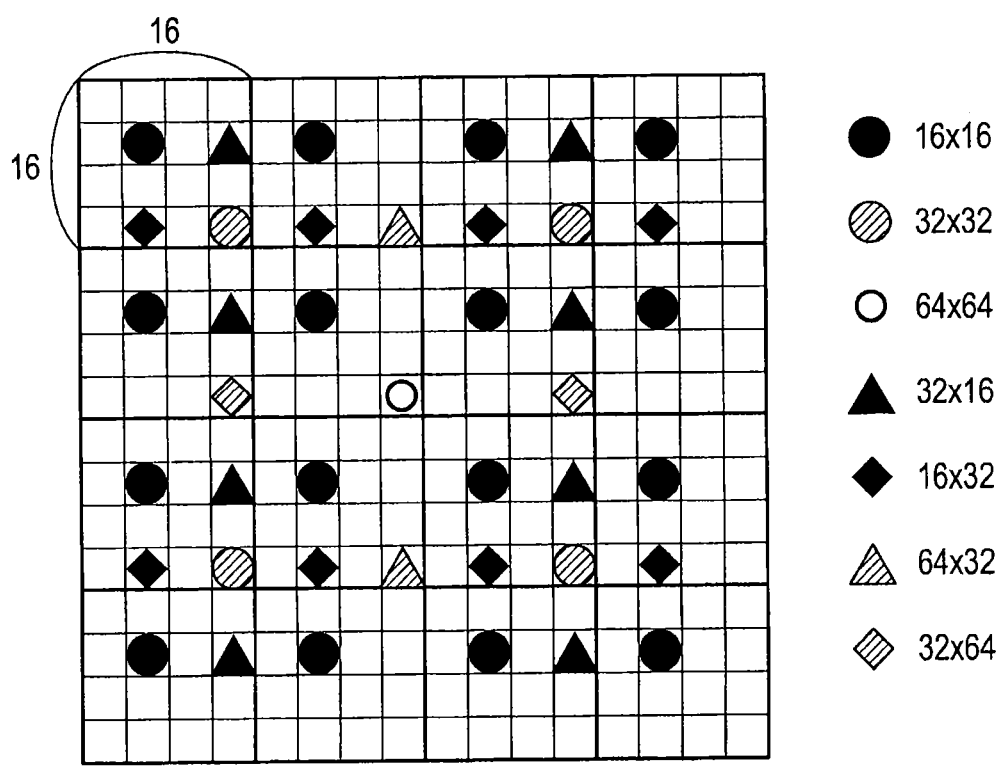
F I G. 19

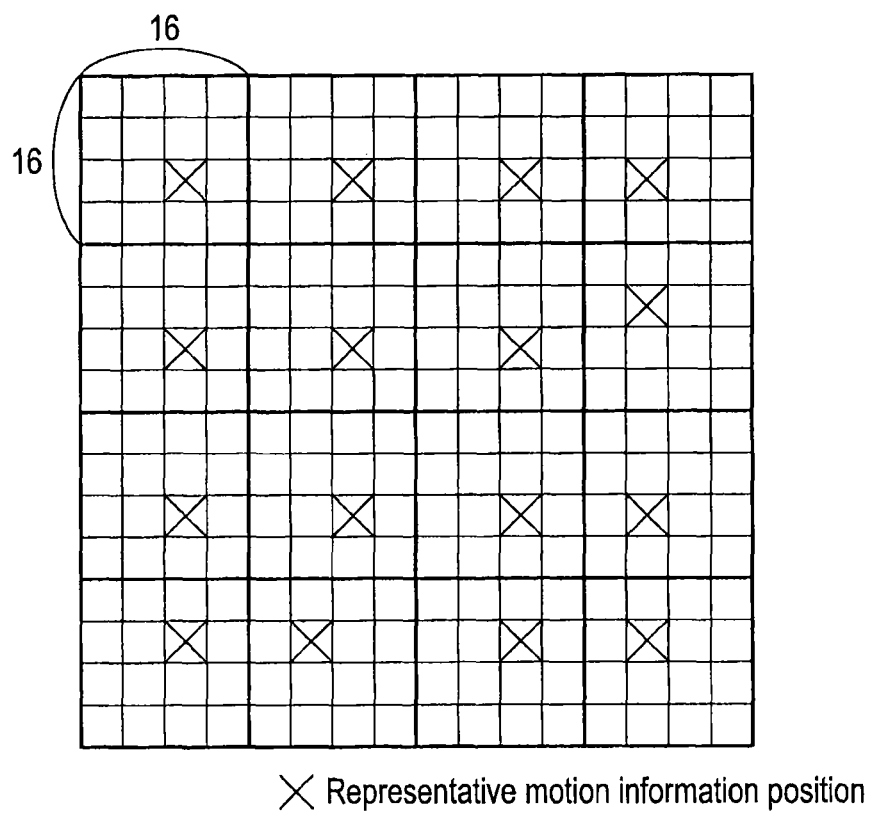
F I G. 20A

✕ Representative motion information position

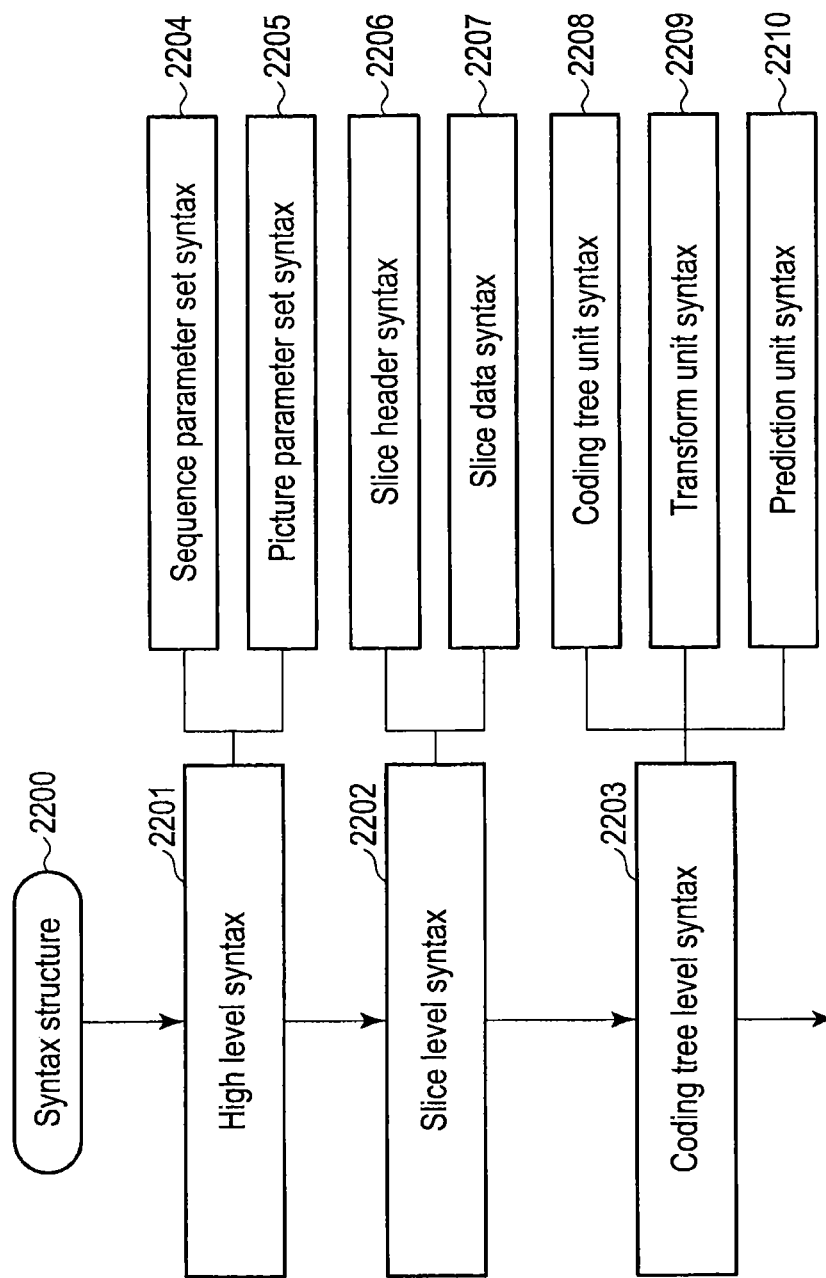
F I G. 22

```
seq parameter set rbsp( ) {
   .....
   motion_vector_buffer_comp_flag
   if ( motion_vector_buffer_comp_flag )
      motion_vector_buffer_comp_ratio_log2
   rbsp trailing bits( )
}
```

F I G. 23A

```
seq parameter set rbsp( ) {
   .....
   motion_vector_buffer_comp_flag
   if ( motion_vector_buffer_comp_flag ){
      motion_vector_buffer_comp_ratio_log2
      motion_vector_buffer_comp_position
   }
   rbsp trailing bits( )
}
```

F I G. 23B

```
prediction unit( x0, y0, log2PUWidth, log2PUHeight ) {
    if( skip flag[ x0 ][ y0 ] {
        if( NumMVPCand( L0 ) > 1)
            mvp idx l0[ x0 ][ y0 ]
        if( NumMVPCand( L1 ) > 1)
            mvp idx l1[ x0 ][ y0 ]
    } else if( PredMode == MODE INTRA ) {
        /* MODE INTRA*/
        ...
    } else {/* MODE MERGE, MODE INTER*/
        if( NumMergeCandidates > 0)
            merge flag[ x0 ][ y0 ]
        if( merge flag[ x0 ][ y0 ] && NumMergeCandidates > 1)
            merge idx[ x0 ][ y0 ]
        } else {
            /* MODE INTER*/
            if( slice type == B)
                inter pred idc[ x0 ][ y0 ]
            if( inter pred idc[ x0 ][ y0 ] ! = pred L1 {
                if( num ref idx l0 active minus1 > 0 )
                    ref idx l0[ x0 ][ y0 ]
                mvd l0[ x0 ][ y0 ][ 0 ]
                mvd l0[ x0 ][ y0 ][ 1 ]
                if( NumMVPCand( L0 ) > 1)
                    mvd l0[ x0 ][ y0 ]
            }
            if( inter pred idc[ x0 ][ y0 ] ! = pred L0) {
                if( num ref idx l1 active minus1 > 0 )
                    ref idx l1[ x0 ][ y0 ]
                mvd l1[ x0 ][ y0 ][ 0 ]
                mvd l1[ x0 ][ y0 ][ 1 ]
                if( NumMVPCand( L1 ) > 1)
                    mvd l1[ x0 ][ y0 ]
            }
        }
    }
}
```

FIG. 24

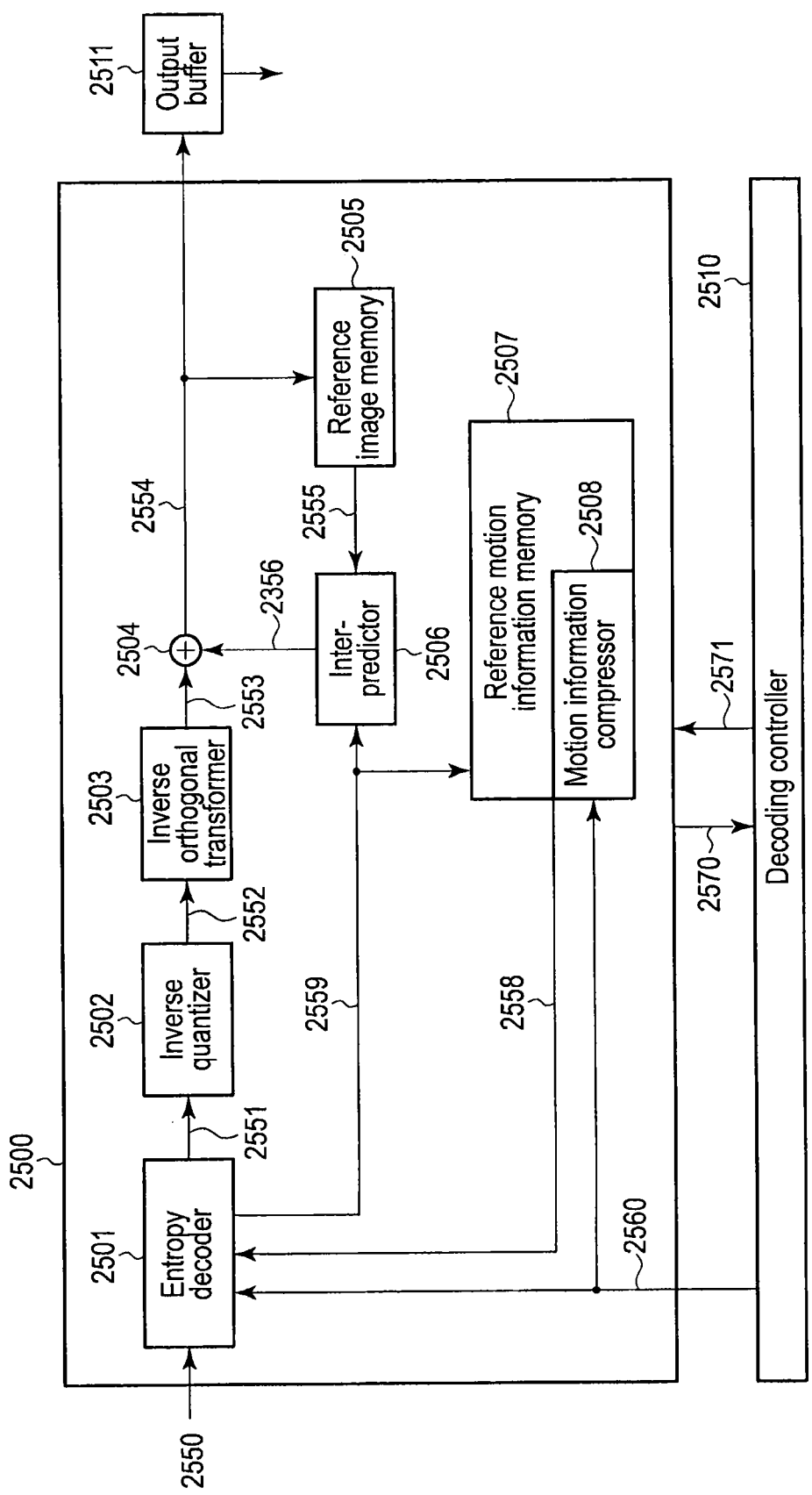
F I G. 25

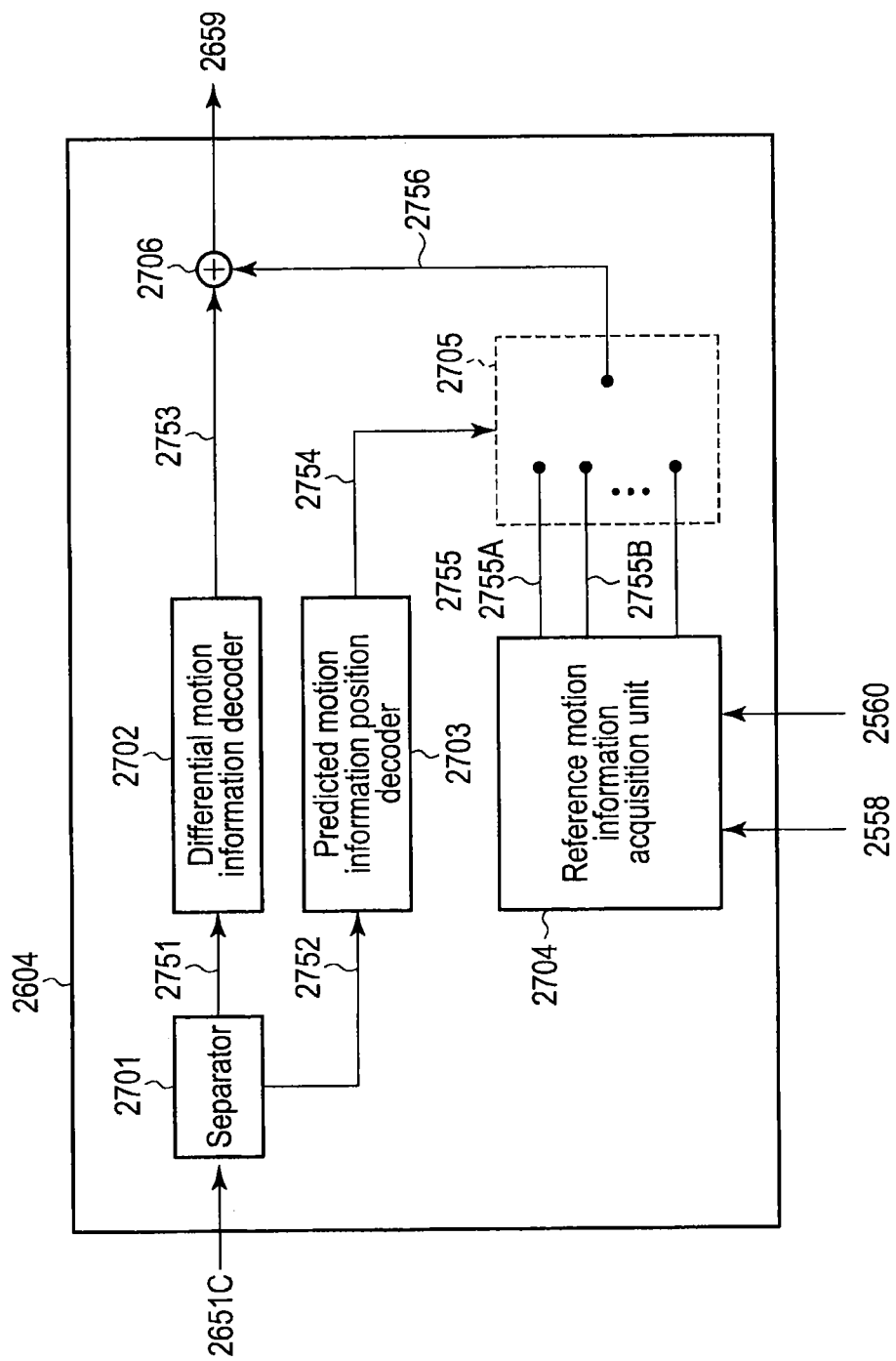
F I G. 27

IMAGE ENCODING AND DECODING METHOD WITH A MERGE FLAG AND MOTION VECTORS

CROSS REFERENCE TO RELATED APPLICATIONS

This application is a Continuation Application of U.S. application Ser. No. 16/665,103, filed Oct. 28, 2019, which is a Continuation Application of U.S. application Ser. No. 15/864,468, filed Jan. 8, 2018, which is a Continuation of U.S. application Ser. No. 14/021,357, filed Sep. 9, 2013, which is a Continuation of PCT Application No. PCT/JP2011/055504, filed Mar. 9, 2011, the entire contents of which are incorporated herein by reference.

FIELD

Embodiments described herein relate generally to a motion information compression method, image encoding method, and image decoding method in the encoding and decoding of a moving image.

BACKGROUND

Recently, an image encoding method having a greatly increased encoding efficiency has been recommended as ITU-T Rec. H.264 and ISO/IEC 14496-10 (referred to as H.264 hereinafter) through the cooperation of ITU-T and ISO/IEC. In H.264, a prediction process, conversion process, and entropy encoding process are performed for each rectangular block (for example, each block of 16×16 or 8×8 pixels). In the prediction process, motion compensation of performing prediction in the temporal domain is performed on a rectangular block to be encoded (an encoding target block) by referring to an already encoded frame (reference frame). In this motion compensation, it is necessary to encode motion information containing a motion vector as spatial shift information between the encoding target block and a block to be referred to in the reference frame, and transmit the encoded motion information to a decoding side. When performing motion compensation by using a plurality of reference frames, it is also necessary to encode reference frame numbers in addition to the motion information. This sometimes increases the code amount of the motion information and reference frame numbers. There are also motion information prediction methods by which predicted motion information of an encoding target block is derived by referring to motion information of a reference frame, which is stored in a motion information memory (Japanese Patent No. 4020789 and Yeping Su et al, "CE9: Reduced Resolution Storage of Motion Vector Data", Joint Collaborative Team on Video Coding (JCT-VC) of ITU-T SG16 WP3 and ISO/IEC JTC1/SC29/WG11 Document, JCTVC-D072, January 2011), and the capacity of the motion information memory for storing motion information sometimes increases.

As an example of a method of reducing the capacity of the motion information memory, representative motion information is derived in a predetermined block and only the representative motion information is stored in the motion information memory in (Yeping Su et al, "CE9: Reduced Resolution Storage of Motion Vector Data", Joint Collaborative Team on Video Coding (JCT-VC) of ITU-T SG16 WP3 and ISO/IEC JTC1/SC29/WG11 Document, JCTVC-D072, January 2011).

Non-Patent Literature 1:

There is, however, a problem that if the predicted motion information derivation method disclosed in J. Jung et al, "Temporal MV Predictor Modification for MV-Comp, Skip, Direct and Merge Schemes", Joint Collaborative Team on Video Coding (JCT-VC) of ITU-T SG16 WP3 and ISO/IEC JTC1/SC29/WG11 Document, JCTVC-D164, January 2011 and the representative motion information derivation method disclosed in Yeping Su et al, "CE9: Reduced Resolution Storage of Motion Vector Data", Joint Collaborative Team on Video Coding (JCT-VC) of ITU-T SG16 WP3 and ISO/IEC JTC1/SC29/WG11 Document, JCTVC-D072, January 2011 are different, the temporal correlation of the predicted motion information reduces, and as a consequence the code amount of the motion information increases.

The present embodiment has been made to solve the abovementioned problem, and has as its object to provide an image encoding apparatus and image decoding apparatus including an information compressing device capable of increasing the encoding efficiency.

BRIEF DESCRIPTION OF THE DRAWINGS

FIG. 3B is a view for explaining another example of the pixel block in the coding tree unit.

FIG. 3C is a view for explaining still another example of the pixel block in the coding tree unit.

FIG. 3D is a view for explaining still another example of the pixel block in the coding tree unit.

FIG. 7A is a view for explaining an example of a prediction unit.

FIG. 7B is a view for explaining another example of the prediction unit.

FIG. 7C is a view for explaining still another example of the prediction unit.

FIG. 7D is a view for explaining still another example of the prediction unit.

FIG. 7E is a view for explaining still another example of the prediction unit.

FIG. 7F is a view for explaining still another example of the prediction unit.

FIG. 9 is a block diagram schematically showing the arrangement of a motion information encoder shown in FIG. 4.

FIG. 12 is a view showing an example of a list indicating the relationship between the block positions and indices Mvpidx of a plurality of predicted motion information candidates.

FIG. 13A is a view showing an example of a reference motion information acquisition position indicating the center of an encoding target prediction unit when the size of the prediction unit is 32×32.

FIG. 13B is a view showing an example of a reference motion information acquisition position indicating the center of an encoding target prediction unit when the size of the prediction unit is 32×16.

FIG. 13C is a view showing an example of a reference motion information acquisition position indicating the center of an encoding target prediction unit when the size of the prediction unit is 16×32.

FIG. 13D is a view showing an example of a reference motion information acquisition position indicating the center of an encoding target prediction unit when the size of the prediction unit is 16×16.

FIG. 13E is a view showing an example of a reference motion information acquisition position indicating the center of an encoding target prediction unit when the size of the prediction unit is 16×8.

FIG. 13F is a view showing an example of a reference motion information acquisition position indicating the center of an encoding target prediction unit when the size of the prediction unit is 8×16.

FIG. 14D is a view showing another example of the reference motion information acquisition position indicating the center of an encoding target prediction unit when the size of the prediction unit is 16×16.

FIG. 14E is a view showing another example of the reference motion information acquisition position indicating the center of an encoding target prediction unit when the size of the prediction unit is 16×8.

FIG. 14F is a view showing another example of the reference motion information acquisition position indicating the center of an encoding target prediction unit when the size of the prediction unit is 8×16.

FIG. 15 is a view for explaining a spatial-domain reference motion information memory 501 and temporal-domain reference motion information memory 502.

FIG. 16 is a flowchart showing an example of the operation of a motion information compressor shown in FIG. 1.

FIG. 17A is a view showing an example of a reference motion information acquisition position indicating the upper left end of an encoding target prediction unit when the size of the prediction unit is 32×32.

FIG. 17B is a view showing an example of a reference motion information acquisition position indicating the upper left end of an encoding target prediction unit when the size of the prediction unit is 32×16.

FIG. 17C is a view showing an example of a reference motion information acquisition position indicating the upper left end of an encoding target prediction unit when the size of the prediction unit is 16×32.

FIG. 17D is a view showing an example of a reference motion information acquisition position indicating the upper left end of an encoding target prediction unit when the size of the prediction unit is 16×16.

FIG. 17E is a view showing an example of a reference motion information acquisition position indicating the upper left end of an encoding target prediction unit when the size of the prediction unit is 16×8.

FIG. 17F is a view showing an example of a reference motion information acquisition position indicating the upper left end of an encoding target prediction unit when the size of the prediction unit is 8×16.

FIG. 19 is a view showing examples of the centers of prediction units having different prediction sizes.

FIG. 20A is a view showing examples of a representative motion information position when the barycenter of a plurality of reference motion information acquisition positions of each motion information compression block is set as the representative motion information position.

FIG. 22 is a view showing a syntax structure according to an embodiment.

FIG. 23A is a view showing an example of a sequence parameter set syntax according to an embodiment.

FIG. 23B is a view showing another example of the sequence parameter set syntax according to the embodiment.

FIG. 24 is a view showing an example of a prediction unit syntax according to an embodiment.

FIG. 25 is a block diagram schematically showing an image decoding apparatus according to the second embodiment.

FIG. 27 is a block diagram schematically showing a motion information decoder shown in FIG. 26.

DETAILED DESCRIPTION

An image encoding apparatus and image decoding apparatus according to each embodiment will be explained in detail below with reference to the accompanying drawings. Note that in the following explanation, the term "image" can appropriately be replaced by terms such as "picture", "pixel", "image signal", and "image data". Note also that in the following embodiments, portions denoted by the same reference number perform the same operation, so a repeated explanation will be omitted.

In general, according to one embodiment, disclosed is a method of dividing an input image signal into pixel blocks, and performing inter-prediction on the divided pixel blocks. This method includes selecting predicted motion information from a motion information buffer storing motion information in an encoded region, and predicting motion information of an encoding target block by using the predicted motion information. The method further includes acquiring representative motion information from a plurality of items of motion information in an encoded region in accordance with first information indicating a method of selecting the predicted motion information, thereby obtaining only the representative motion information.

First Embodiment

The first embodiment is directed to an image encoding apparatus. An image decoding apparatus corresponding to the image encoding apparatus according to this embodiment will be explained in the second embodiment. This image encoding apparatus can be implemented by hardware such as a large-scale integration (LSI) chip, digital signal processor (DSP), or field-programmable gate array (FPGA). This image encoding apparatus can also be implemented by causing a computer to execute an image encoding program.

Figure 1:
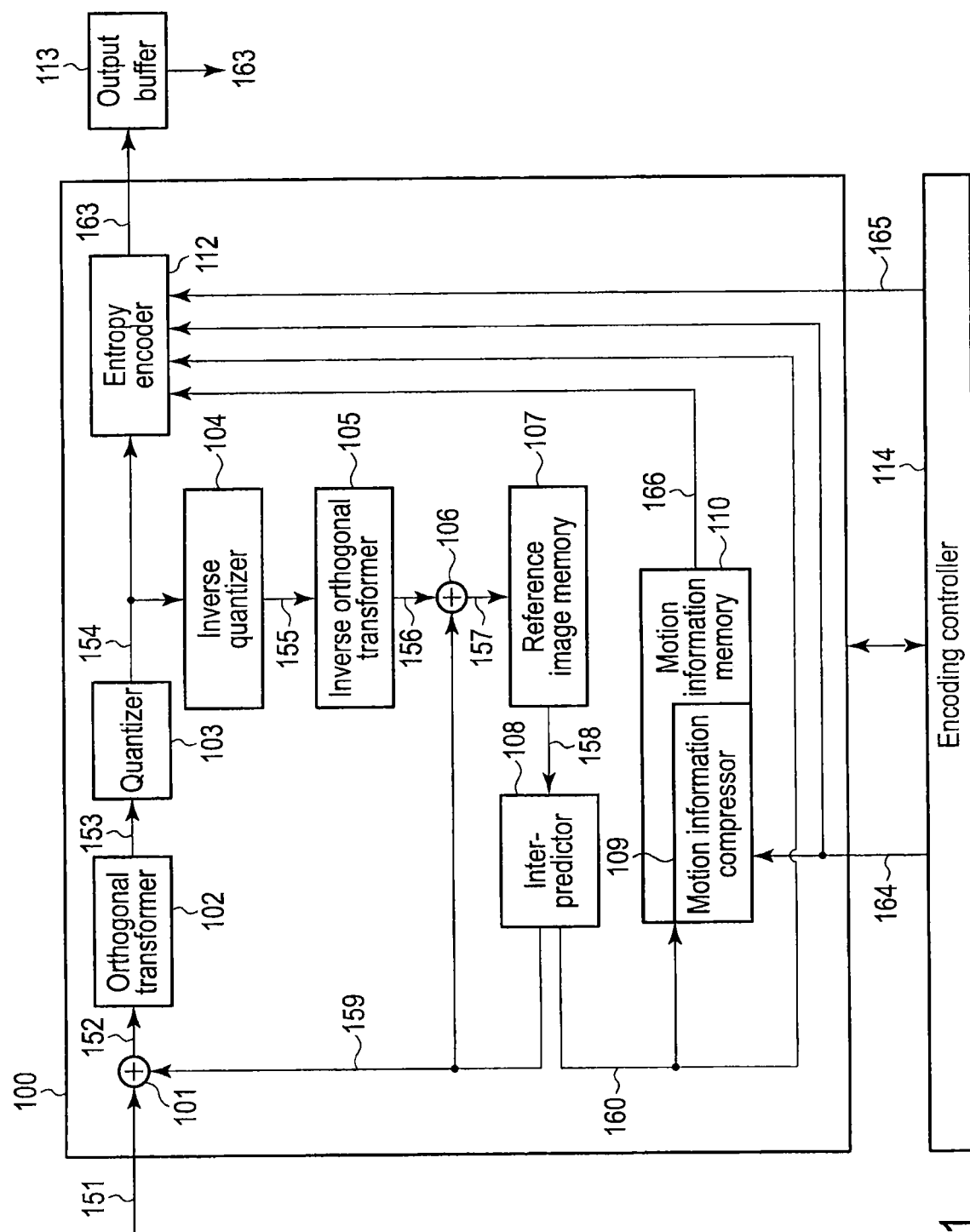
FIG. 1 is a block diagram schematically showing the arrangement of an image encoding apparatus according to the first embodiment.

As shown in FIG. 1, an image encoding apparatus 100 according to this embodiment includes a subtracter 101, orthogonal transformer 102, quantizer 103, inverse quantizer 104, inverse orthogonal transformer 105, adder 106, reference image memory 107, inter-predictor 108, motion information compressor 109, motion information memory 110, and entropy encoder 112. An encoding controller 114 and output buffer 113 are normally installed outside the image encoding apparatus 100.

Figure 2A:
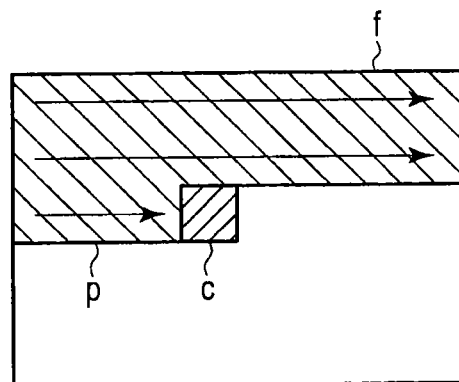
FIG. 2A is a view for explaining a pixel block predictive encoding sequence.

The image encoding apparatus 100 shown in FIG. 1 divides each frame, each field, or each slice forming an input image signal 151 into a plurality of pixel blocks, performs predictive encoding on these divided pixel blocks, and outputs encoded data 163. In the following explanation, it is assumed, for the sake of simplicity, that the predictive encoding of pixel blocks is performed from the upper left corner to the lower right corner, as shown in FIG. 2A. Referring to FIG. 2A, encoded pixel blocks p are positioned above and on the left side of an encoding target pixel block c in a frame f as an encoding target.

Figure 2B:
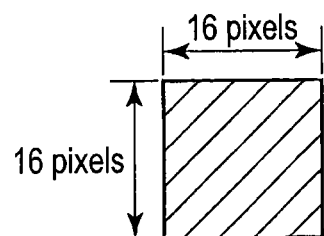
FIG. 2B is a view for explaining an example of a pixel block size.
Figure 2C:
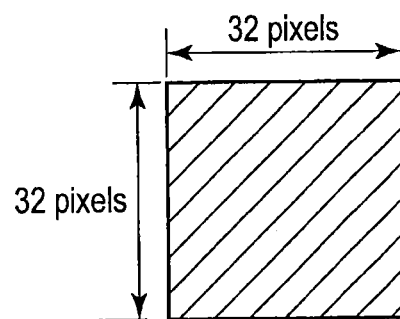
FIG. 2C is a view for explaining another example of the pixel block size.
Figure 2D:
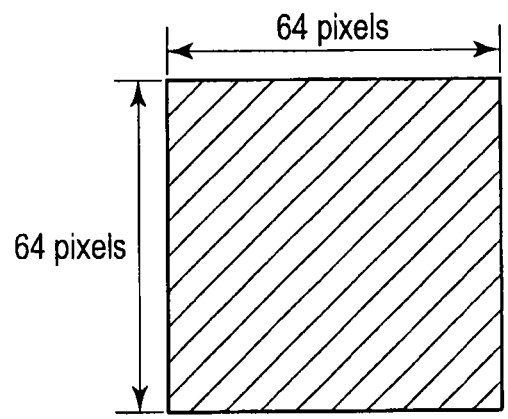
FIG. 2D is a view for explaining still another example of the pixel block size.

The pixel block is an image processing unit such as a block of M×N pixels (N and M being natural numbers), a coding unit, a macro block, a sub-block, or one pixel. Note that the pixel block basically means a coding unit in the following explanation, but the pixel block can also be interpreted as the above-described meanings by appropriately replacing the terms. The coding unit is typically, for example, a block of 16×16 pixels, as shown in FIG. 2B, but may also be a block of 32×32 pixels, as shown in FIG. 2C, or a block of 64×64 pixels, as shown in FIG. 2D. The coding unit can also be a block of 8×8 pixels (not shown) or a block of 4×4 pixels (not shown). Furthermore, the coding unit need not be square. In the following explanation, the encoding target block or coding unit of the input image signal 151 will also be referred to as a "prediction target block". In addition, the encoding unit is not limited to a pixel block such as the coding unit, and it is also possible to use a frame, field, or slice, or a combination thereof.

Figure 3A:
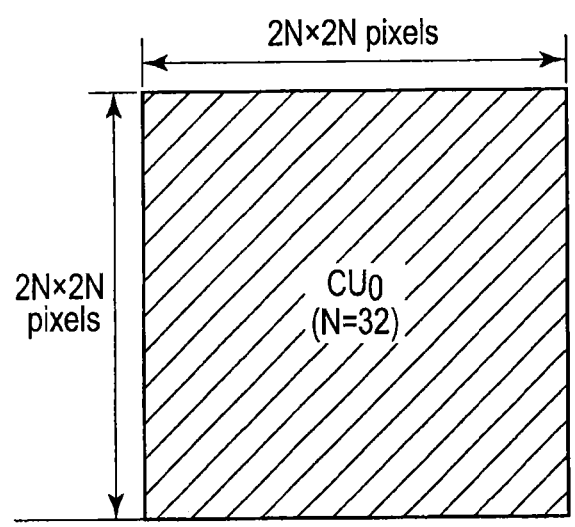
FIG. 3A is a view for explaining an example of a pixel block in a coding tree unit.

FIGS. 3A, 3B, 3C, and 3D are views showing practical examples of the coding unit. FIG. 3A shows an example in which the size of the coding unit is 64×64 pixels (N=32). N represents the size of the coding unit as a reference. A size when the coding unit is divided is defined as N, and that when it is not divided is defined as 2N. A coding tree unit has a quadtree structure. When the coding tree unit is divided, indices are allocated to four pixel blocks in Z-scan order. FIG. 3B shows an example in which quadtree division is performed on the block of 64×64 pixels shown in FIG. 3A. Numbers shown in FIG. 3B represent the ordinal numbers in Z-scan. It is also possible to further perform quadtree division on one quadtree index of the coding unit. The depth of division is defined as Depth. That is, FIG. 3A shows an example in which Depth=0. FIG. 3C shows an example of a coding unit having a size of 32×32 pixels (N=16) when Depth=1. The largest unit of a coding tree unit like this is called a large coding tree unit or tree block, and the input image signal is encoded in raster scan order by using this unit, as shown in FIG. 2A.

On the basis of an encoding parameter input from the encoding controller 114, the image encoding apparatus 100 shown in FIG. 1 performs inter-prediction (also called inter-image prediction, inter-frame prediction, or motion compensation prediction) or intra-prediction (also called intra-image prediction or intra-frame prediction) (not shown) on the pixel block, thereby generating a predicted image signal 159. The image encoding apparatus 100 orthogonally transforms and quantizes a prediction error signal 152 between the pixel block (input image signal 151) and predicted image signal 159, generates the encoded data 163 by performing entropy encoding, and outputs the encoded data 163.

The image encoding apparatus 100 shown in FIG. 1 performs encoding by selectively applying a plurality of prediction modes having different block sizes and different methods of generating the predicted image signal 159. The methods of generating the predicted image signal 159 are roughly classified into two types: intra-prediction that performs prediction within an encoding target frame; and inter-prediction that performs prediction by using one reference frame or a plurality of temporally different reference frames.

Each element included in the image encoding apparatus 100 shown in FIG. 1 will be explained below.

The subtracter 101 obtains the prediction error signal 152 by subtracting, from the encoding target block of the input image signal 151, the predicted image signal 159 corresponding to the encoding target block. The subtracter 101 inputs the prediction error signal 152 to the orthogonal transformer 102.

The orthogonal transformer 102 obtains a transform coefficient 153 by performing orthogonal transformation such as a discrete cosine transform (DCT) on the prediction error signal 152 from the subtracter 101. The orthogonal transformer 102 outputs the transform coefficient 153 to the quantizer 103.

The quantizer 103 obtains a quantized transform coefficient 154 by quantizing the transform coefficient 153 from the orthogonal transformer 102. More specifically, the quantizer 103 performs quantization in accordance with quantization information such as a quantization parameter and quantization matrix designated by the encoding controller 114. The quantization parameter indicates the fineness of quantization. The quantization matrix is used to weigh the quantization fineness for each component of the transform coefficient, but whether to use the quantization matrix is not essential to the embodiment. The quantizer 103 outputs the quantized transform coefficient 154 to the entropy encoder 112 and inverse quantizer 104.

The entropy encoder 112 performs entropy encoding (for example, Huffman encoding or arithmetic encoding) on various encoding parameters such as the quantized transform coefficient 154 from the quantizer 103, motion information 160 from the inter-predictor 108, prediction information 165 designated by the encoding controller 114, reference position information 164 from the encoding controller 114, and the quantization information, thereby generating the encoded data 163. Note that the encoding parameters are parameters necessary for decoding, such as the prediction information 165, information of the transform coefficient, and information of quantization. For example, the encoding controller 114 includes an internal memory (not shown), and this memory stores the encoding parameters. When encoding a prediction target block, the encoding parameters of an already encoded pixel block adjacent to the prediction target block are used.

Figure 4:
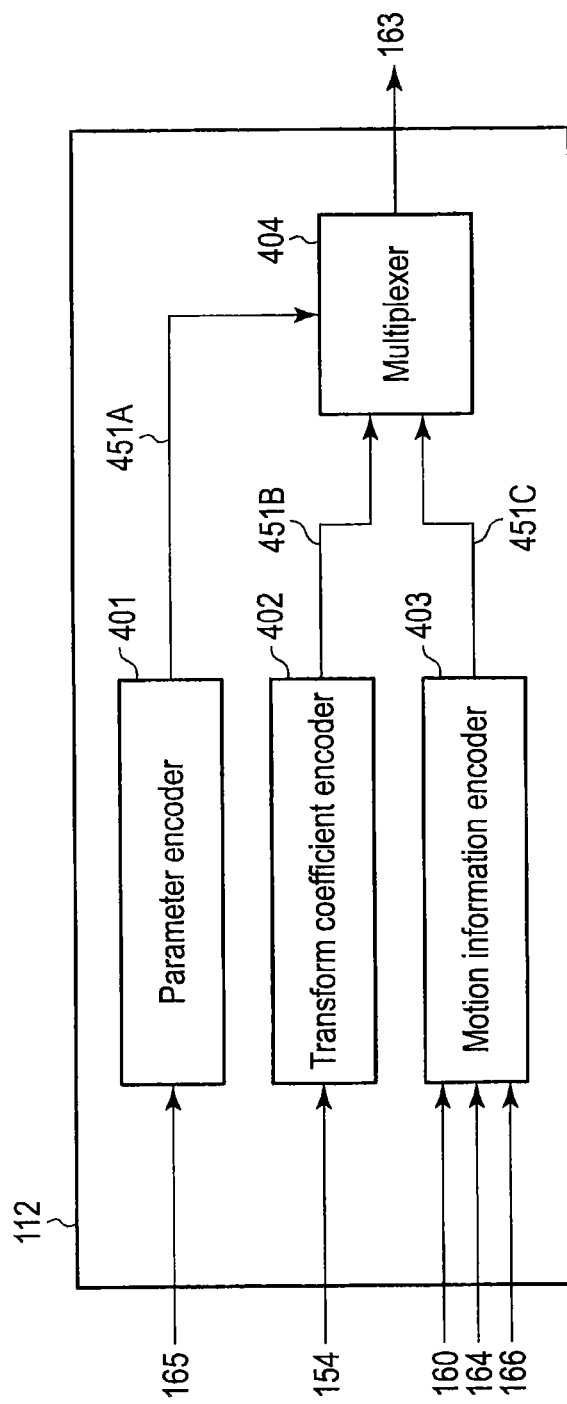
FIG. 4 is a block diagram schematically showing the arrangement of an entropy encoder shown in FIG. 1.

More specifically, as shown in FIG. 4, the entropy encoder 112 includes a parameter encoder 401, transform coefficient encoder 402, motion information encoder 403, and multiplexer 404. The parameter encoder 401 generates encoded data 451A by encoding the encoding parameters such as the prediction information 165 received from the encoding controller 114. The transform coefficient encoder 402 generates encoded data 451B by encoding the quantized transform coefficient 154 received from the quantizer 103.

The motion information encoder 403 encodes the motion information 160 received from the inter-predictor 108 by referring to reference motion information 166 received from the motion information memory 110 and reference position information 164 received from the encoding controller 114, thereby generating encoded data 451C. Details of the motion information encoder 403 will be described later.

The multiplexer 404 generates the encoded data 163 by multiplexing the encoded data 451A, 451B, and 451C. The generated encoded data 163 contains all parameters necessary for decoding, such as the information of the transform coefficient and the information of quantization, in addition to the motion information 160 and prediction information 165.

The encoded data 163 generated by the entropy encoder 112 is temporarily stored in the output buffer 113 after, for example, multiplication, and output at a proper output timing managed by the encoding controller 114. The encoded data 163 is output to, for example, a storage system (storage medium) (not shown) or a transmission system (communication line) (not shown).

The inverse quantizer 104 obtains a restored transform coefficient 155 by inversely quantizing the quantized transform coefficient 154 from the quantizer 103. More specifically, the inverse quantizer 104 performs inverse quantization in accordance with the quantization information used in the quantizer 103. The quantization information used in the quantizer 103 is loaded from the internal memory of the encoding controller 114. The inverse quantizer 104 outputs the restored transform coefficient 155 to the inverse orthogonal transformer 105.

The inverse orthogonal transformer 105 performs, on the restored transform coefficient 155 from the inverse quantizer 104, inverse orthogonal transformation such as an inverse discrete cosine transform corresponding to the orthogonal transformation performed in the orthogonal transformer 102, thereby obtaining a restored prediction error signal 156. The inverse orthogonal transformer 105 outputs the restored prediction error signal 156 to the adder 106.

The adder 106 generates a local decoded image signal 157 by adding the restored prediction error signal 156 and corresponding predicted image signal 159. The decoded image signal 157 is input to the reference image memory 107 through a deblocking filter or Wiener filter (not shown).

The reference image memory 107 stores a locally decoded filtered image signal 158. The inter-predictor 108 refers to the filtered image signal 158 as a reference image signal 158 when generating a predicted image as needed.

The inter-predictor 108 performs inter-prediction by using the reference image signal 158 saved in the reference image memory 107. More specifically, the inter-predictor 108 derives a motion difference (motion vector) by performing a block matching process between the prediction target block and reference image signal 158. Based on this motion vector, the inter-predictor 108 generates an inter-predicted image by performing motion compensation (interpolation for a motion at decimal precision). In H.264, interpolation can be performed up to ¼-pixel precision. The derived motion vector is entropically encoded as a part of the motion information 160.

Figure 5:
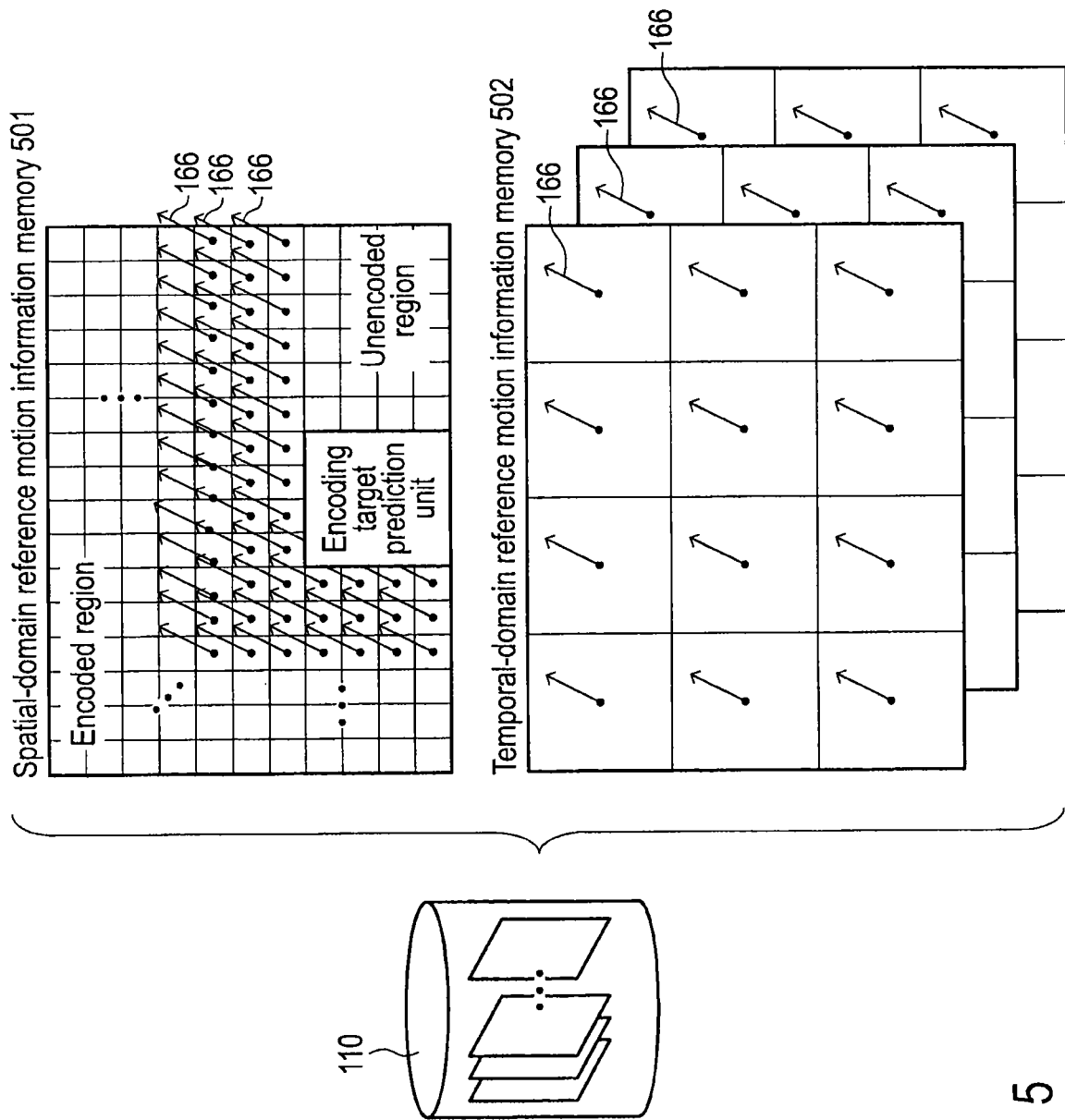
FIG. 5 is a view schematically showing the arrangement of a motion information memory shown in FIG. 1.

The motion information memory 110 includes the motion information compressor 109. The motion information memory 110 reduces the information amount of the motion information 160 by appropriately performing a compression process, and temporarily stores the compressed motion information as the reference motion information 166. As shown in FIG. 5, the motion information memory 110 is stored for each frame (or slice), and the motion information memory 110 further includes a spatial-domain reference motion information memory 501 for storing the motion information 160 on the same frame as the reference motion information 166, and a temporal-domain reference motion information memory 502 for storing the motion information 160 of an already encoded frame as the reference motion information 166. The motion information memory 110 can also include a plurality of temporal-domain reference motion information memories 502 in accordance with the number of reference frames to be used by the encoding target frame for prediction.

Also, the spatial-domain reference motion information memory 501 and temporal-domain reference motion information memory 502 can be obtained by logically splitting a physically single memory. Furthermore, the spatial-domain reference motion information memory 501 can store only spatial-domain motion information necessary for a frame currently being encoded, and items of spatial-domain motion information that are no longer necessary as reference information can sequentially be compressed and stored in the temporal-domain reference motion information memory 502.

The reference motion information 166 is stored for each predetermined region (for example, each 4×4 pixel block) in the spatial-domain reference motion information memory 501 and temporal-domain reference motion information memory 502. The reference motion information 166 further contains information indicating whether the region is encoded by inter-prediction (to be described later) or intra-prediction (to be described later). Also, even when a coding unit (or prediction unit) is inter-predicted by using the motion information 160 predicted from an encoded region without encoding the value of the motion vector in the motion information 160, such as in a skip mode or direct mode defined by H.264 or in a merge mode (to be described later), motion information of the coding unit (or prediction unit) is stored as the reference motion information 166.

When the process of encoding the encoding target frame or slice is complete, the handling of the spatial-domain reference motion information memory 501 of the frame is changed to that of the temporal-domain reference motion information memory 502 for a frame to be encoded next. In this step, to reduce the memory capacity of the temporal-domain reference motion information memory 502, the motion information 160 compressed by the motion information compressor 109 (to be described later) is stored in the temporal-domain reference motion information memory 502.

The prediction information 165 complies with a prediction mode controlled by the encoding controller 114. As described above, it is possible to select inter-prediction, or intra-prediction (not shown) or inter-prediction in order to generate the predicted image signal 159. It is also possible to further select a plurality of modes for each of intra-prediction and inter-prediction. The encoding controller 114 determines one of the plurality of prediction modes of intra-prediction and inter-prediction as an optimum prediction mode, and sets the prediction information 165.

For example, the encoding controller 114 determines an optimum prediction mode by using a cost function indicated by equation (1) below:

$$K=SAD+\lambda \times OH \qquad (1)$$

In equation (1) (to be called a simplified encoding cost hereinafter), OH indicates the code amount of the prediction information 160 (for example, motion vector information or predicted block size information), and SAD indicates a difference absolute value sum (i.e., the cumulative sum of the absolute values of the prediction error signal 152) between the prediction target block and predicted image signal 159. Also, λ indicates a Lagrange undetermined multiplier to be determined based on the value of the quantization information (quantization parameter), and K indicates the encoding cost. When using equation (1), a prediction mode that minimizes the encoding cost K is determined as an optimum prediction mode from the viewpoints of the generated code amount and prediction error. As a variation of equation (1), it is also possible to estimate the encoding cost from only the OH or SAD, or estimate the encoding cost by using a value obtained by performing a Hadamard transform on the SAD or an approximation of the value.

Furthermore, an optimum prediction mode can be determined by using a temporary encoding unit (not shown). For example, the encoding controller 114 determines an optimum prediction mode by using a cost function indicated by equation (2) below:

$$J=D+\lambda \times R \qquad (2)$$

In equation (2), D indicates a square error sum (i.e., encoding distortion) between a prediction target block and locally decoded image, R indicates a code amount estimated by temporary encoding for a prediction error between the prediction target block and the predicted image signal 159 of the prediction mode, and J indicates the encoding cost. When calculating the encoding cost J (to be called a detailed encoding cost hereinafter) of equation (2), a temporary encoding process and local decoding process are necessary for each prediction mode, so the circuit scale or calculation amount increases. On the other hand, the encoding cost J is calculated based on a more accurate encoding distortion and more accurate code amount. This facilitates maintaining a high encoding efficiency by accurately determining an optimum prediction mode. Note that as a variation of equation (2), it is also possible to estimate the encoding cost from only the R or D, or estimate the encoding cost by using an approximate value of the R or D. Furthermore, a hierarchical use of these costs is also possible. The encoding controller 114 can also previously decrease the number of candidates of prediction modes for performing determination using equation (1) or (2), based on information (for example, prediction modes of surrounding pixel blocks or the result of image analysis) preobtained for a prediction target block.

As a modification of this embodiment, it is possible to further reduce the number of prediction mode candidates while maintaining the encoding performance, by performing two-step mode determination combining equations (1) and (2). The simplified encoding cost indicated by equation (1) requires no local decoding process unlike equation (2), and hence can be calculated at high speed. The image encoding apparatus of this embodiment has more prediction modes than those of H.264, so mode determination using the detailed encoding cost is unrealistic. As a first step, therefore, mode determination using the simplified encoding cost is performed on prediction modes usable for the corresponding pixel block, thereby deriving prediction mode candidates.

Since the correlation between the simplified encoding cost and detailed encoding cost increases as the value of the quantization parameter defining the roughness of quantization increases, the number of prediction mode candidates is changed by using this property.

Next, the prediction process of the image encoding apparatus 100 will be explained.

Although not shown, a plurality of prediction modes are prepared for the image encoding apparatus 100 shown in FIG. 1, and the method of generating the predicted image signal 159 and the motion compensation block size change from one prediction mode to another. The methods by which the predictor 108 generates the predicted image signal 159 are roughly classified into intra-prediction (intra-frame prediction) that generates a predicted image by using the reference image signal 158 of the encoding target frame (or field), and inter-prediction (inter-frame prediction) that generates a predicted image by using the reference image signal 158 of one or more encoded reference frames (or reference fields). The predictor 108 generates the predicted image signal 159 of the encoding target block by selectively switching intra-prediction and inter-prediction.

Figure 6A:
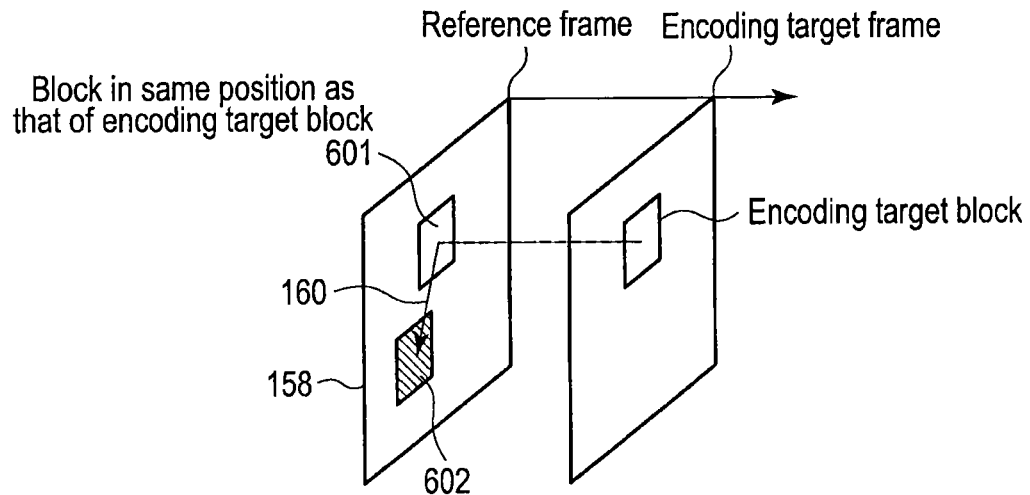
FIG. 6A is a view for explaining an example of an inter-prediction process executed by an inter-predictor shown in FIG. 1.

FIG. 6A shows an example of inter-prediction. Inter-prediction is typically executed for each prediction unit, and each prediction unit can have unique motion information 160. In inter-prediction, as shown in FIG. 6A, the predicted image signal 159 is generated by using the reference image signal 158 of a block 602 in a position spatially shifted, in accordance with the motion vector contained in the motion information 160, from a block 601 which is a pixel block in an already encoded reference frame (for example, an immediately preceding encoded frame) and exists in the same position as that of an encoding target prediction unit. That is, the predicted image signal 159 is generated by using the reference image signal 158 of the block 602 in the reference frame, which is specified by the position (coordinates) of the encoding target block and the motion vector contained in the motion information 160.

In inter-prediction, motion compensation at small-number-of-pixel precision (for example, ½-pixel precision or ¼-pixel precision) is possible, and the value of an interpolating pixel is generated by filtering the reference image signal 158. For example, an interpolation process of up to ¼-pixel precision can be performed on a luminance signal in H.264. This interpolation process can be executed by using arbitrary filtering instead of filtering defined by H.264.

Figure 6B:
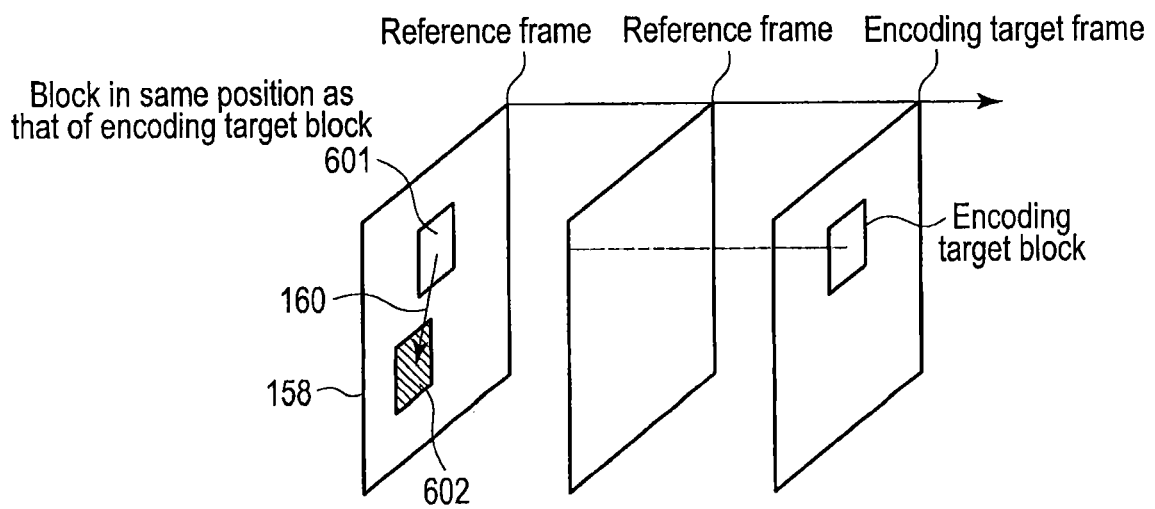
FIG. 6B is a view for explaining another example of the inter-prediction process executed by the inter-predictor shown in FIG. 1.

Note that in inter-prediction, it is possible to use not only an immediately preceding reference frame, as shown in FIG. 6A, but also any already encoded reference frame, as shown in FIG. 6B. When the reference image signals 158 of a plurality of reference frames having different time positions are stored, information indicating the time position of the reference image signal 158 from which the predicted image signal 159 is generated is represented by a reference frame number. The motion information 160 contains this reference frame number. The reference frame number can be changed for each region (for example, each picture, slice, or block). That is, different reference frames can be used for different prediction units. As an example, when an immediately preceding encoded reference frame is used in prediction, the reference frame number of this region is set to zero. When an encoded reference frame two frames before an encoding target frame is used in prediction, the reference frame number of this region is set to 1. As another example, when the reference image signal 158 of only one frame is stored in the reference image memory 107 (when only one reference frame is stored), the reference frame number is always set to zero.

Figures 7G, 8:
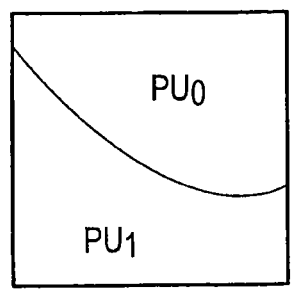
FIG. 7G is a view for explaining still another example of the prediction unit.
FIG. 8 is a view for explaining a skip mode, merge mode, and inter mode.

In addition, it is possible to selectively use a size suitable for an encoding target block from a plurality of prepared prediction unit sizes. For example, motion compensation can be performed for each prediction unit obtained by dividing coding tree units, as shown in FIGS. 7A, 7B, 7C, 7D, 7E, 7F, and 7G. It is also possible to perform motion compensation for each prediction unit divided into a shape other than a square, as shown in FIG. 7F or 7G.

As described previously, the motion information 160 of an encoded pixel block (for example, a block of 4×4 pixels) in an encoding target frame to be used in inter-prediction is stored as the reference motion information 166. Therefore, the shape and motion vector of an optimum motion compensation block and the reference frame number can be used in accordance with the local property of the input image signal 151. It is also possible to freely combine coding units and prediction units. When the coding unit is a block of 64×64 pixels, each of four coding tree units (blocks of 32×32 pixels) obtained by dividing the block of 64×64 pixels can further be divided into four blocks. This makes it possible to hierarchically use blocks of 16×16 pixels from the block of 64×64 pixels. It is similarly possible to hierarchically use blocks of 8×8 pixels from the block of 64×64 pixels. When the prediction unit is obtained by dividing the coding tree unit into four blocks, it is possible to execute a hierarchical motion compensation process from a block of 64×64 pixels to blocks of 4×4 pixels.

Furthermore, in inter-prediction, bidirectional prediction using two kinds of motion compensation can be executed on an encoding target pixel block. In H.264, a new predicted image signal (not shown) is obtained by performing two kinds of motion compensation on an encoding target pixel block, and calculating the weighted average of two kinds of predicted image signals. In this bidirectional prediction, the two kinds of motion compensation will be referred to as list 0 prediction and list 1 prediction.

<Explanation of Skip Mode, Merge Mode, and Inter Mode>

The image encoding apparatus 100 according to this embodiment uses a plurality of prediction modes having different encoding processes, as shown in FIG. 8. Referring to FIG. 8, the skip mode is a mode in which only the syntax of a predicted motion information position 954 (described later) is encoded, and other syntaxes are not encoded. The merge mode is a mode in which only the syntax of the predicted motion information position 954 and the transform coefficient information 153 are encoded, and other syntaxes are not encoded. The inter mode is a mode in which the syntax of the predicted motion information position 954, differential motion information 953 (to be described later), and the transform coefficient information 153 are encoded. These modes are switched by the prediction information 165 controlled by the encoding controller 114.

<Motion Information Encoder 403>

The motion information encoder 403 will be explained below with reference to FIG. 9.

The motion information encoder 403 includes a reference motion vector acquisition unit 901, predicted motion vector selection switch (to be also referred to as a predicted motion information selection switch) 902, subtracter 903, differential motion information encoder 904, predicted motion information position encoder 905, and multiplexer 906.

Figure 10:
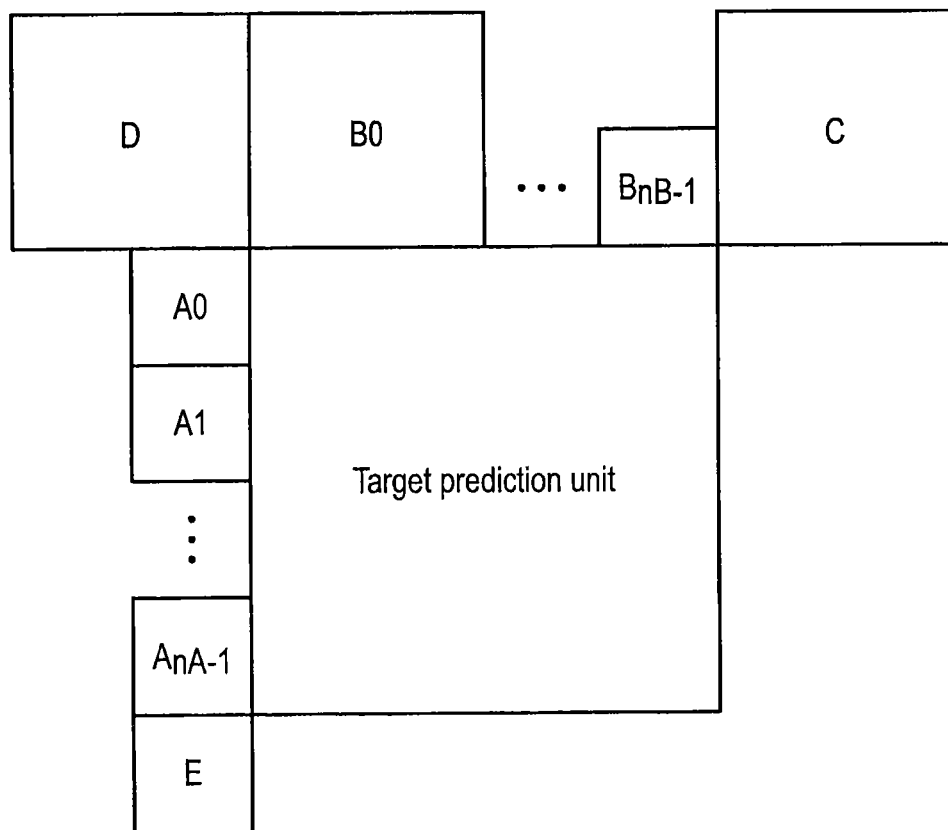
FIG. 10 is a view for explaining examples of the position of a predicted motion information candidate with respect to an encoding target prediction unit.
Figure 11:
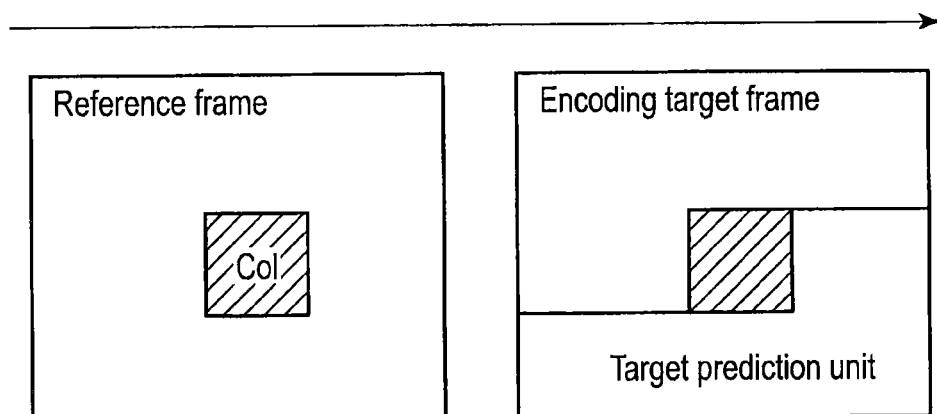
FIG. 11 is a view for explaining another example of the position of the predicted motion information candidate with respect to the encoding target prediction unit.
Figure 14A:
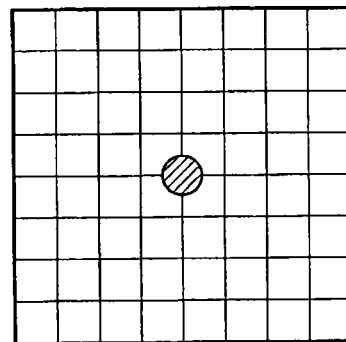
FIG. 14A is a view showing another example of the reference motion information acquisition position indicating the center of an encoding target prediction unit when the size of the prediction unit is 32×32.
Figure 14B:
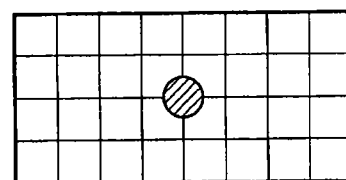
FIG. 14B is a view showing another example of the reference motion information acquisition position indicating the center of an encoding target prediction unit when the size of the prediction unit is 32×16.
Figure 14C:
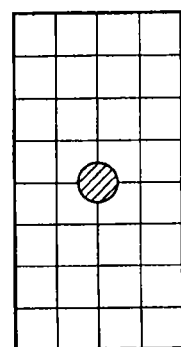
FIG. 14C is a view showing another example of the reference motion information acquisition position indicating the center of an encoding target prediction unit when the size of the prediction unit is 16×32.

The reference motion vector acquisition unit 901 receives the reference motion information 166 and reference position information 164, and generates at least one predicted motion information candidate (also referred to as a predicted motion vector candidate) 951 (951A, 951B, . . . ). FIGS. 10 and 11 illustrate examples of the position of the predicted motion information candidate 951 with respect to a target prediction unit. FIG. 10 shows the positions of prediction units spatially adjacent to the target prediction unit. AX (X=0 to nA−1) indicates an adjacent prediction unit on the left side of the target prediction unit, BY (Y=0 to nB−1) indicates an adjacent prediction unit above the target prediction unit, and C, D, and E respectively indicate adjacent prediction units at the upper right corner, upper left corner, and lower left corner of the target prediction unit. FIG. 11 shows the position of a prediction unit in an already encoded reference frame with respect to the encoding target prediction unit. In FIG. 11, Col indicates a prediction unit, which exists in the same position as that of the encoding target prediction unit, in the reference frame. FIG. 12 shows an example of a list indicating the relationship between the block positions and indices Mvpidx of a plurality of predicted motion information candidates 951. Indices 0 to 2 of Mvpidx indicate the predicted motion vector candidates 951 positioned in the spatial domain, and index 3 of Mvpidx indicates the predicted motion vector candidate 951 positioned in the temporal domain. Prediction unit position A is the position of a prediction unit of inter-prediction, i.e., a prediction unit having the reference motion information 166, in AX, as shown in FIG. 10, and the value of X is smallest at prediction unit position A. Prediction unit position B is the position of a prediction unit of inter-prediction, i.e., a prediction unit having the reference motion information 166, in BY, as shown in FIG. 10, and the value of Y is smallest in prediction unit position B. When prediction unit position C is not inter-prediction, the reference motion information 166 in prediction unit position D is replaced with the reference motion information 166 in prediction unit position C. When prediction unit positions C and D are not inter-prediction, the reference motion information 166 in prediction unit position E is replaced with reference motion information 166 in prediction unit position C.

If the size of the encoding target prediction unit is larger than that of the smallest prediction unit, prediction unit position Col may store a plurality of items of reference motion information 166 in the temporal-domain reference motion information memory 502. In this case, the reference motion information 166 in the prediction unit at position Col is acquired in accordance with the reference position information 164. The acquisition position of the reference motion information 166 in the prediction unit at position Col will be referred to as a reference motion information acquisition position hereinafter. FIGS. 13A, 13B, 13C, 13D, 13E, and 13F illustrate examples of the reference motion information acquisition position for each encoding target prediction unit size (32×32 to 16×16) when the reference position information 164 indicates the center of the prediction unit in position Col. In FIGS. 13A, 13B, 13C, 13D, 13E, and 13F, each block indicates a 4×4 prediction unit, and a circle indicates the position of a 4×4 prediction unit to be acquired as the predicted motion information candidate 951. FIGS. 14A, 14B, 14C, 14D, 14E, and 14F illustrate other examples of the reference motion information acquisition position. Referring to FIGS. 14A, 14B, 14C, 14D, 14E, and 14F, no 4×4 prediction unit exists in the position of a circle, so the predicted motion information candidate 951 is generated by a predetermined method such as the average or median of the reference motion information 166 in four 4×4 prediction units adjacent to the circle. As still another example of the reference motion information acquisition position, the reference motion information 166 of a 4×4 prediction unit positioned at the upper left corner of the prediction unit in position Col may also be used as the predicted motion information candidate 951. In a case other than the above-mentioned examples, it is possible to generate the predicted motion information candidate 951 by using any position and any method, provided that the method is a predetermined method.

Note that if no reference motion information 166 exists, the motion information 160 having a zero vector is output as the predicted motion information candidate 951.

By the processing described above, at least one predicted motion information candidate 951 is output from the reference motion block. If the reference frame number of the aforementioned predicted motion information candidate 951 is different from that of the encoding target prediction unit, the predicted motion information candidate 951 can be scaled by using the reference frame number of the predicted motion information candidate 951 and that of the encoding target prediction unit.

The predicted motion information selection switch 902 selects one of the plurality of predicted motion information candidates 951 in accordance with a command from the encoding controller 114, and outputs the predicted motion information 952. The predicted motion information selection switch 902 may also output the predicted motion information position information 954 (to be described later). The abovementioned selection can be performed by using an evaluation function such as equation (1) or (2). The subtracter 903 subtracts the predicted motion vector information 952 from the motion information 160, and outputs the differential motion information 953 to the differential motion information encoder 904. The differential motion information encoder 904 encodes the differential motion information 953, and outputs encoded data 960A. Note that in the skip mode and merge mode, the differential motion information encoder 904 need not encode the differential motion information 953.

The predicted motion information position encoder 905 encodes the predicted motion information position information 954 (Mvpidx) indicating which predicted motion information candidate 951 is selected from the list shown in FIG. 12, and outputs encoded data 960B. The predicted motion information position information 954 is encoded by using fixed-length encoding or variable-length encoding generated from the total number of predicted motion information candidates 951. Variable-length encoding may also be performed using the correlation with adjacent blocks. Furthermore, if a plurality of predicted motion information candidates 951 have identical information, it is also possible to encode the predicted motion information position information 954 by forming a code table from the total number of predicted motion information candidates 951 from which the identical predicted motion information candidates 951 are deleted. Also, if the total number of predicted motion information candidates 951 is 1, it is determined that the corresponding predicted motion information candidate 951 is the predicted motion information 952, so the predicted motion information position information 954 need not be encoded.

In addition, in the skip mode, merge mode, and inter mode, the methods of deriving the predicted motion information candidate 951 need not be the same, and it is possible to independently set the methods of deriving the predicted motion information candidate 951. This embodiment will be explained by assuming that the same method of deriving the predicted motion information candidate 951 is used in the skip mode and merge mode, and a different method of deriving the predicted motion information candidate 951 is used in the merge mode.

<Details of Motion Information Compressor 109>

First, the motion information compression process will be explained with reference to FIG. 15. In FIG. 15, the reference motion information 166 of the spatial-domain reference motion information memory 501 is compressed and stored in the temporal-domain reference motion information memory 502. The reference motion information 166 which is stored in the representative motion information position for each motion information compression block (in FIG. 15, a block of 16×16 pixels) in the spatial-domain reference motion information memory 501 is stored in the temporal-domain reference motion information memory 502. When performing the above-described motion information encoding process, the reference motion information 166 stored in the above-described reference motion information acquisition position is set as the predicted motion information candidate 951. In this case, it is also possible to assume that the motion information compression block virtually has the same reference motion information 166, and set the reference motion information 166 stored in the above-described reference motion information position as the predicted motion information candidate 951 (the same predicted motion information candidate 951 is derived).

Next, the motion information compressor 109 will be explained with reference to the flowchart shown in FIG. 16. When the process of encoding a frame (or an arbitrary unit such as a slice or coding unit) is complete, the motion information compression 109 compresses the motion information 160 and stores the motion information 160 in the temporal-domain reference motion information memory 502.

First, the reference position information 164 is acquired from the encoding controller 114 (step S1601), and a frame is divided into motion information compression blocks as compression units of the motion information 160 (step S1602). The motion information compression block is a pixel block larger than a unit (typically, a block of 4×4 pixels) by which the motion information 160 is stored by the motion compensation process, and is typically a block of 16×16 pixels. The motion information compression block may also be a block of 64×64 pixels, a block of 32×32 pixels, a block of 8×8 pixels, a rectangular pixel block, or a pixel region having an arbitrary shape.

Then, a representative motion information position is generated in accordance with the reference position information 164 (step S1603). As an example of generating a representative motion information position, when the motion information compression block is a block of 16×16 pixels, the reference motion information acquisition position when the prediction unit size is 16×16, as shown in FIGS. 13D, 14D, and 17D, is set as the representative motion information position. Subsequently, the reference motion information 166 of the generated representative motion information position is set as representative motion information (step S1604), and the representative motion information is stored in the temporal-domain reference motion information memory (step S1605). Steps S1604 and S1605 described above are executed for all motion information compression blocks.

When the unit for storing the motion information 160 is an M×M block and the size of the motion information compression block is N×N (N is a multiple of M), the capacity of the reference motion information memory can be reduced to (M×M)/(N×N) by executing the aforementioned motion information compression process.

<Other Embodiments of Representative Motion Information Position>

Figure 18A:
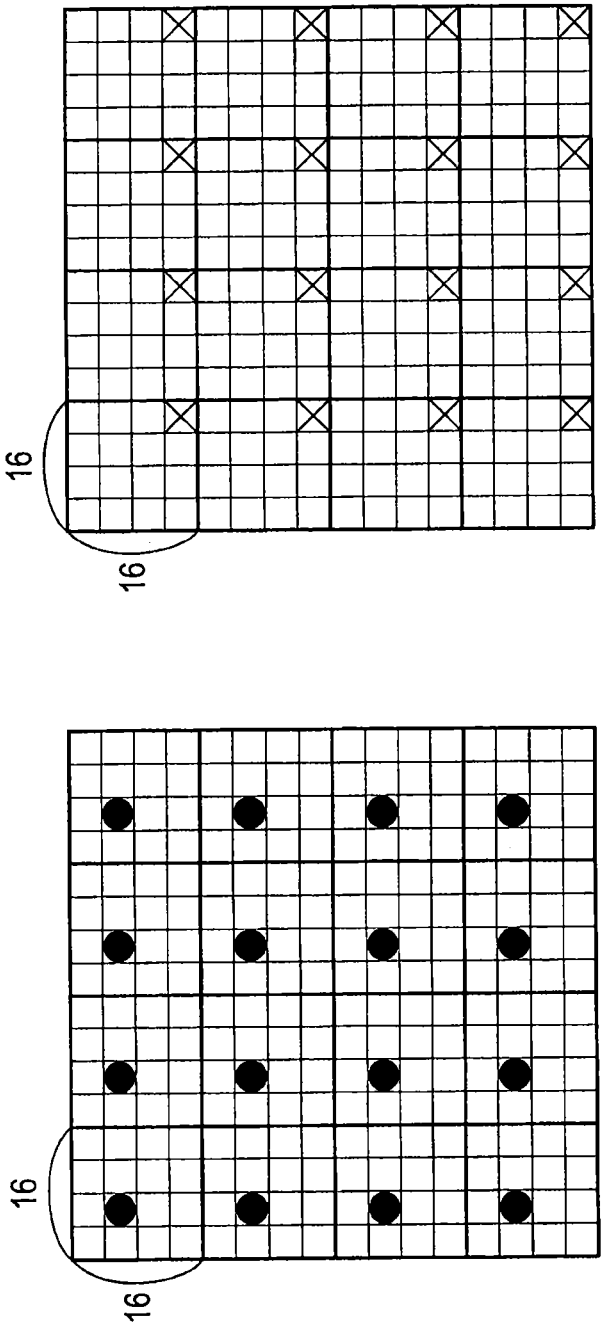
FIG. 18A is a view showing examples of a representative motion information position.
Figure 18B:
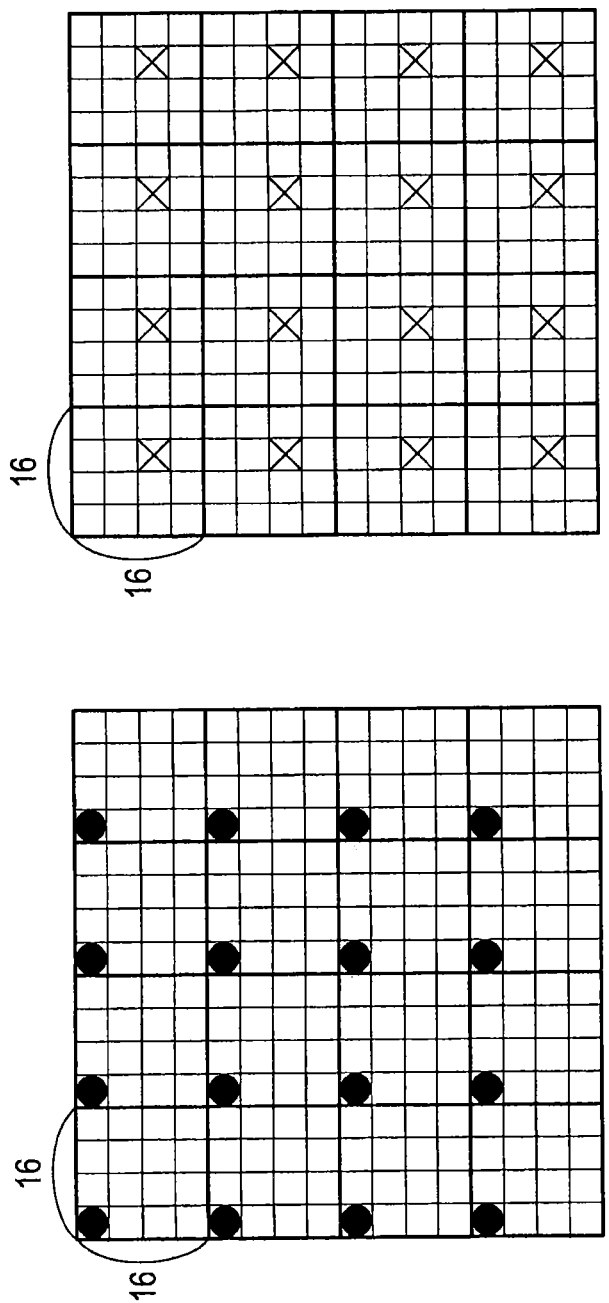
FIG. 18B is a view showing other examples of the representative motion information position.

As another example of generating a representative motion information position, the central position of a plurality of reference motion information acquisition positions may also be used as the representative motion information position. FIGS. 18A and 18B show the representative motion information position of each motion compression block having a size of 16×16. FIG. 18A shows representative motion information positions when reference motion information acquisition positions are the positions shown in FIG. 13D. Likewise, FIG. 18B shows representative motion information positions when reference motion information acquisition positions are the positions shown in FIG. 17D. Symbols ● in FIGS. 18A and 18B indicate reference motion information acquisition positions when a prediction unit is a 16×16 block. A representative motion information position indicated by x is placed in the central position (also called the barycentric position) of four reference motion information acquisition positions.

As still another example of generating a representative motion information position, it is also possible to use a reference motion information acquisition position for each size of a plurality of prediction units as the reference position information 164, and generate a representative motion information position from a plurality of reference motion information acquisition positions.

As an example of generating a representative motion information position, it is also possible to use a reference motion information acquisition position for each size of a plurality of prediction units as the reference position information 164, and generate a representative motion information position from a plurality of reference motion information acquisition positions. FIG. 19 shows the center (reference motion information acquisition position) of each prediction unit having a prediction unit size of 16×16 or more, when a tree block is a block of 64×64 pixels.

As another example of generating a representative motion information position, a representative motion information position can also be set by using a reference motion information acquisition position set for each motion information compression block. FIG. 20A shows an example when the barycenter of a plurality of reference motion information acquisition positions in each motion information compression block is set as a representative motion information position. If the barycentric position does not match the position of a 4×4 block, it is possible to set the nearest 4×4 block as a representative motion information position, or generate the reference motion vector 166 of the barycentric position by using interpolation such as bi-linear interpolation.

Figure 20B:
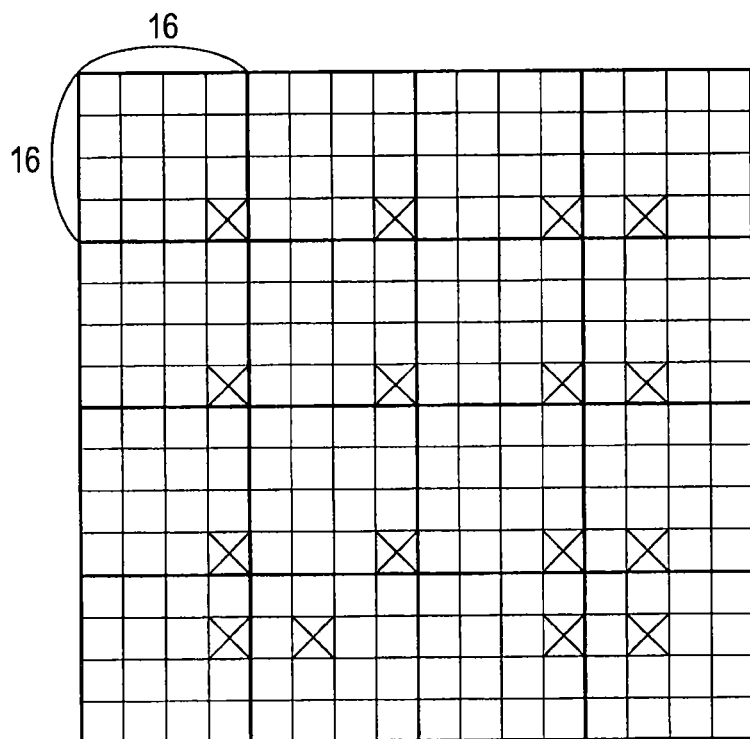
FIG. 20B is a view showing other examples of the representative motion information position when the barycenter of a plurality of reference motion information acquisition positions of each motion information compression block is set as the representative motion information position.

FIG. 20B shows an example in which one of a plurality of reference motion information acquisition positions is selected for each motion information compression block, and set as a representative motion information position.

Figure 21A:
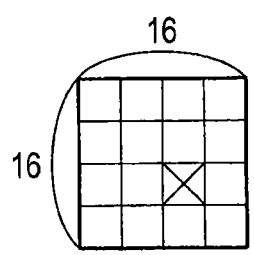
FIG. 21A is a view showing an example of a representative motion information position.
Figure 21B:
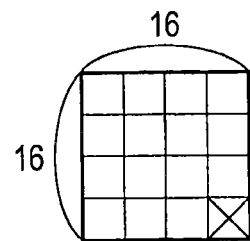
FIG. 21B is a view showing another example of the representative motion information position.

Furthermore, FIGS. 21A and 21B illustrate examples when motion information compression blocks have the same reference motion information acquisition position in a tree block. Since all motion information compression blocks have the same representative motion information position, representative motion information positions need not be switched in accordance with a position in the tree block. The representative motion information position need not be those shown in FIGS. 21A and 21B, and can be any position such as the upper left corner or upper right corner in the motion information compression block.

As an example of generating a representative motion information position, a representative motion information position may also be indicated by using BlkIdx indicating positions of 4×4 blocks in a motion information compression block in Z-scan order. When the size of the motion information compression block is 16×16, the representative motion information position shown in FIG. 21A is equivalent to the position of BlkIdx=12. Also, the representative motion information position shown in FIG. 21B is equivalent to the position of BlkIdx=15.

As another example of the motion information compression process, the motion information compression process may also include reference frame numbers in order to reduce the memory capacity for reference frame numbers. In this case, a reference frame number stored in a representative motion information position is stored in the memory capacity for reference frame numbers. Accordingly, the spatial-domain reference motion information memory 501 and temporal-domain reference motion information memory 502 shown in FIG. 5 store reference frame numbers in addition to the motion vector information.

As still another example of the motion information compression process, when the motion information compression process does not include any reference frame number, motion vector information in motion information in a representative motion information position can be scaled by using a reference frame number, and stored in the motion information memory 110. A typical example of the scaling process is a linear scaling process based on reference frame number zero. That is, if the reference frame number is not zero, the linear scaling process is performed such that the motion vector information refers to a reference frame corresponding to reference frame number zero. The basis of the above-described scaling process may also be a value other than reference frame number zero. If division occurs when performing the above-described linear scaling process, this division can be implemented by looking up a division process table formed beforehand.

When the size of the motion information compression block is not a 16×16 block, a representative motion information position is generated by using the same processing as described above. As an example, when the size of the motion information compression block is 64×64, a reference motion information acquisition position in a 64×64 prediction unit is set as a representative motion information position. As another example, a representative motion information position in the 16×16 motion information compression block shown in, for example, FIGS. 21A and 21B can be scaled in the horizontal and vertical directions in accordance with the motion information compression block size, and the scaled position can be set as a representative motion information position.

If no reference motion information exists because a representative motion information position is outside a picture or slice, a position where reference motion information can be acquired in a motion information compression block, for example, the upper left corner of the motion information compression block can be set as a new representative motion information position. Also, if no reference motion information exists because a representative motion information position is a region to which intra-prediction is applied, a new representative motion information position can be set by executing the same processing.

<Syntax Configuration>

The syntax used by the image encoding apparatus 100 shown in FIG. 1 will be explained below.

The syntax indicates the structure of encoded data (for example, the encoded data 163 shown in FIG. 1) obtained when the image encoding apparatus encodes moving image data. When decoding this encoded data, an image decoding apparatus interprets the syntax by referring to the same syntax structure. FIG. 22 shows an example of a syntax 2200 used by the image encoding apparatus shown in FIG. 1.

The syntax 2200 includes three parts, i.e., a high level syntax 2201, slice level syntax 2202, and coding tree level syntax 2203. The high level syntax 2201 contains syntax information of layers higher than a slice. The slice is a rectangular region or continuous region included in a frame or field. The slice level syntax 2202 contains information necessary to decode each slice. The coding tree level syntax 2203 contains information necessary to decode each coding tree (i.e., each coding tree unit). These parts each further include detailed syntaxes.

The high level syntax 2201 includes sequence and picture level syntaxes such as a sequence parameter set syntax 2204 and picture parameter set syntax 2205. The slice level syntax 2202 includes a slice header syntax 2206 and slice data syntax 2207. The coding tree level syntax 2203 includes a coding tree unit syntax 2208, transform unit syntax 2209, and prediction unit syntax 2210.

The coding tree unit syntax 2208 can have a quadtree structure. More specifically, the coding tree unit syntax 2208 can recursively be called as a syntax element of the coding tree unit syntax 2208. That is, one coding tree unit can be subdivided by a quadtree. Also, the coding tree unit syntax 2208 includes the transform unit syntax 2209 and prediction unit syntax 2210. The transform unit syntax 2209 and prediction unit syntax 2210 are called in each coding tree unit syntax 2208 at the endmost portion of the quadtree. Information of prediction is described in the prediction unit syntax 2210. Information of inverse orthogonal transformation and quantization is described in the transform unit syntax 2209.

FIG. 23 shows examples of the sequence parameter set syntax 2204 according to this embodiment. The flag motion_vector_buffer_comp_flag shown in FIGS. 23A and 23B is a syntax indicating whether motion information compression according to this embodiment is valid/invalid for the sequence. If motion_vector_buffer_comp_flag is 0, motion information compression according to this embodiment is invalid for the sequence. Accordingly, the processing of the motion information compressor shown in FIG. 1 is skipped. As an example, if motion_vector_buffer_comp_flag is 1, motion information compression according to this embodiment is valid for the sequence. The value motion_vector_buffer_comp_ratio_log 2 shown in FIGS. 23A and 23B is information indicating the unit of the motion information compression process, and is shown when motion_vector_buffer_comp_flag is 1. For example, motion_vector_buffer_comp_ratio_log 2 indicates information of the size of the motion information compression block according to this embodiment, and a value obtained by multiplying the smallest unit of motion compensation by $2^{(motion\_vector\_buffer\_comp\_ratio\_log\ 2)}$ is the size of the motion information compression block. An example in which the smallest unit of motion compensation is a block of 4×4 pixels, i.e., the reference motion information memory is stored for each block of 4×4 pixels, will be described below. When motion_vector_buffer_comp_ratio_log 2 is 1, the size of the motion information compression block according to this embodiment is a block of 8×8 pixels. Similarly, when motion_vector_buffer_comp_ratio_log 2 is 2, the size of the motion information compression block according to this embodiment is a block of 16×16 pixels. The value motion_vector_buffer_comp_position shown in FIG. 23B is information indicating a representative motion information position in the motion information compression block, and is shown when motion_vector_buffer_comp_flag is 1. For example, motion_vector_buffer_comp_position may also indicate a reference motion information position in the motion information compression block, as shown in FIGS. 21A and 21B, or indicate a reference motion information position in each motion information compression block, as shown in FIGS. 20A and 20B. Also, motion_vector_buffer_comp_position can further indicate the center of a plurality of blocks.

As another example, the validity/invalidity of prediction according to this embodiment may also be defined for each local region inside the slice in syntaxes of layers (for example, the picture parameter syntax, slice level syntax, coding tree unit, and transform unit) below motion_vector_buffer_comp_flag, motion_vector_buffer_comp_ratio_log 2, and motion_vector_buffer_comp_position.

FIG. 24 shows an example of the prediction unit syntax. The flag skip_flag shown in FIG. 24 indicates whether prediction mode of a coding unit to which the prediction unit syntax belongs is the skip mode. If skip_flag is 1, it indicates that syntaxes (the coding unit syntax, prediction unit syntax, and transform unit syntax) other than the prediction motion information position information 954 are not encoded. NumMVPCand(L0) and NumMVPCand(L1) respectively indicate the numbers of predicted motion information candidates 951 in list 0 prediction and list 1 prediction. If the predicted motion information candidate 951 exists (NumMVPCand(LX)>0, X=0 or 1), mvp_idx_lX indicating the predicted motion position information 954 is encoded.

If skip_flag is 0, it indicates that the prediction mode of a coding unit to which the prediction unit syntax belongs is not the skip mode. NumMergeCandidates indicates the number of predicted motion information candidates 951 derived in FIG. 12 or the like. If the predicted motion information candidate 951 exists (NumMergeCandidates>0), merge_flag as a flag indicating whether the prediction unit is the merge mode is encoded. When the value of merge_flag is 1, the flag indicates that the prediction unit is the merge mode. If the value is 0, the flag indicates that the prediction unit uses the inter mode. If merge_flag is 1 and two or more predicted motion information candidates 951 exist (NumMergeCandidates>1), merge_idx as the predicted motion information 952 indicating a block of the predicted motion information candidates 951 from which merge is started is encoded.

If merge_flag is 1, prediction unit syntaxes other than merge_flag and merge_idx need not be encoded.

If merge_flag is 0, it indicates that the prediction unit is the inter mode. In the inter mode, mvd_lX (X=0 or 1) indicating differential motion vector information contained in the differential motion information 953 and reference frame number ref_idx_lX are encoded, and, in the case of a B slice, inter_pred_idc indicating whether the prediction unit is unidirectional prediction (list 0 or list 1) or bidirectional prediction is encoded. In addition, NumMVPCand (L0) and NumMVPCand(L1) are acquired as in the slip mode. If the predicted motion information candidate 951 exists (NumMVPCand(LX)>0, X=0 or 1), mvp_idx_lX indicating the predicted motion information position information 954 is encoded.

The foregoing is the syntax configuration according to this embodiment.

Second Embodiment

The second embodiment is directed to an image decoding apparatus. The image encoding apparatus corresponding to the image decoding apparatus according to this embodiment is explained in the first embodiment. That is, the image decoding apparatus according to this embodiment decodes, for example, encoded data generated by the image encoding apparatus according to the first embodiment.

As shown in FIG. 25, the image decoding apparatus according to this embodiment includes an entropy decoder 2501, inverse quantizer 2502, inverse orthogonal transformer 2503, adder 2504, reference image memory 2505, inter-predictor 2506, reference motion information memory 2507, reference motion information compressor 2508, and decoding controller 2510.

The image decoding apparatus shown in FIG. 25 decodes encoded data 2550, stores a decoded image signal 2554 in an output buffer 2511, and outputs the decoded image signal 2554 as an output image. The encoded data 2550 is output from, for example, the image encoding apparatus shown in FIG. 1, and input to an image decoding apparatus 2500 through a storage system (not shown) or transmission system (not shown).

The entropy decoder 2501 performs decryption based on syntaxes in order to decode the encoded data 2550. The entropy decoder 2501 sequentially entropically decodes a code sequence of each syntax, and reproduces encoding parameters, such as motion information 2559 and a quantized transform coefficient 2551, of an encoding target block. The encoding parameters are parameters necessary to decode, for example, prediction information, information of a transform coefficient, and information of quantization.

Figure 26:
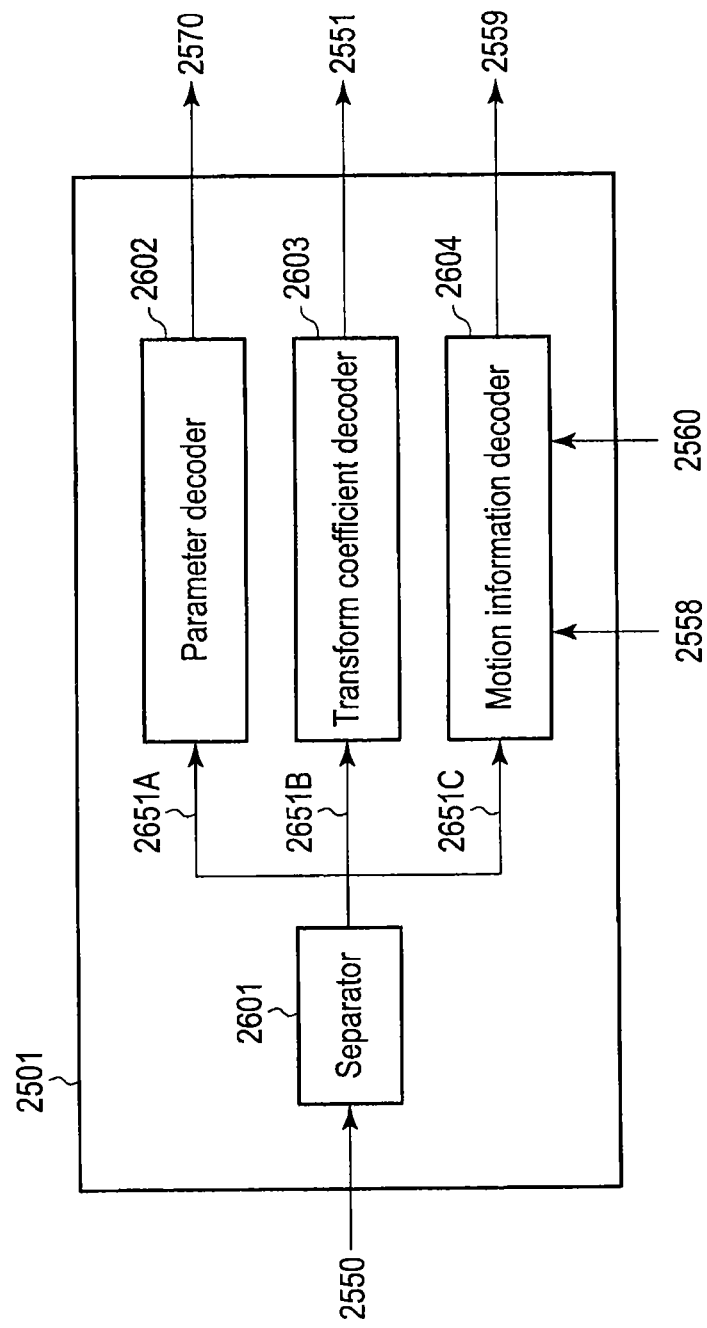
FIG. 26 is a block diagram schematically showing an entropy decoder shown in FIG. 25.

More specifically, as shown in FIG. 26, the entropy decoder 2501 includes a separator 2601, parameter decoder 2602, transform coefficient decoder 2603, and motion information decoder 2604. The separator 2601 separates the encoded data 2550, and outputs encoded data 2651A of a parameter to the parameter decoder 2602, encoded data 2651B of a transform coefficient to the transform coefficient decoder 2603, and encoded data 2651C of motion information to the motion information decoder 2604. The parameter decoder 2602 decodes an encoding parameter 2651A such as prediction information and outputs the encoding parameter 2570 to the decoding controller 2510. The transform coefficient decoder 2603 receives the encoded data 2651B, decodes the transform coefficient information 2551, and outputs the decoded information to the inverse quantizer 2502.

The motion information decoder 2604 receives the encoded data 2651C from the separator 2601, reference position information 2560 from the decoding controller 2510, and reference motion information 2558 from the reference motion information memory 2507, and outputs the motion information 2559. The output motion information 2559 is input to the inter-predictor 2506.

As shown in FIG. 27, the motion information decoder 2604 includes a separator 2701, a differential motion information decoder 2702, predicted motion information position decoder 2703, reference motion information acquisition unit 2704, predicted motion information selection switch 2705, and adder 2706.

The encoded data 2651C of motion information is input to the separator 2701, and separated into encoded data 2751 of differential motion information and encoded data 2752 of a predicted motion information position. The differential motion information encoder 2702 receives the encoded data 2751 of differential motion information, and decodes differential motion information 2753. The adder 2706 adds the differential motion information 2753 to predicted motion information 2756 (to be described later), and outputs motion information 2759. The predicted motion information position decoder 2703 receives the encoded data 2752 of a predicted motion information position, and decodes a predicted motion information position 2754.

The predicted motion information selection switch 2705 receives the predicted motion information position 2754, and selects the predicted motion information 2756 from predicted motion information candidates 2755. The predicted motion information position information 2560 is decoded by using fixed-length decoding or variable-length decoding generated from the number of predicted motion information candidates 2755. Variable-length decoding may also be performed using the correlation with adjacent blocks. Furthermore, if a plurality of predicted motion information candidates 2755 are identical, the predicted motion information position information 2560 can be decoded based on a code table generated from the total number of predicted motion information candidates 2755 from which the identical candidates are deleted. In addition, if the total number of predicted motion information candidates 2755 is 1, the corresponding predicted motion information candidate 2755 is determined as the predicted motion information 2556, so the predicted motion information position information 2754 need not be decoded.

The arrangement and processing contents of the predicted motion information acquisition unit 2704 are the same as those of the predicted motion information acquisition unit 901 explained in the first embodiment.

The reference motion information acquisition unit 2704 receives the reference motion information 2558 and reference position information 2560, and generates at least one predicted motion information candidate 2755 2755A, 2755B, . . . ). FIGS. 10 and 11 illustrate examples of the position of the predicted motion information candidate 2755 with respect to a decoding target prediction unit. FIG. 10 shows the positions of prediction units spatially adjacent to the decoding target prediction unit. AX (X=0 to nA−1) indicates an adjacent prediction unit on the left side of the target prediction unit, BY (Y=0 to nB−1) indicates an adjacent prediction unit above the target prediction unit, and C, D, and E respectively indicate adjacent prediction units at the upper right corner, upper left corner, and lower left corner of the target prediction unit. FIG. 11 shows the position of a prediction unit in an already decoded reference frame with respect to the decoding target prediction unit. In FIG. 11, Col indicates a prediction unit, which exists in the same position as that of the decoding target prediction unit, in the reference frame. FIG. 12 shows an example of a list indicating the relationship between the block positions and indices Mvpidx of a plurality of predicted motion information candidates 2755. Indices 0 to 2 of Mvpidx indicate the predicted motion vector candidates 2755 positioned in the spatial domain, and index 3 of Mvpidx indicates the predicted motion vector candidate 2755 positioned in the temporal domain. Prediction unit position A is the position of a prediction unit of inter-prediction, i.e., a prediction unit having the reference motion information 2558, in AX, as shown in FIG. 10, and the value of X is smallest at prediction unit position A. Prediction unit position B is the position of a prediction unit of inter-prediction, i.e., a prediction unit having the reference motion information 2558, in BY, as shown in FIG. 10, and the value of Y is smallest in prediction unit position B. When prediction unit position C is not inter-prediction, the reference motion information 2558 in prediction unit position D is replaced with the reference motion information 2558 in prediction unit position C. When prediction unit positions C and D are not inter-prediction, the reference motion information 2558 in prediction unit position E is replaced with reference motion information 2558 in prediction unit position C.

If the size of the encoding target prediction unit is larger than that of the smallest prediction unit, prediction unit position Col may store a plurality of items of reference motion information 2558 in the temporal-domain reference motion information memory 2507. In this case, the reference motion information 2558 in the prediction unit at position Col is acquired in accordance with the reference position information 2560. The acquisition position of the reference motion information 2558 in the prediction unit at position Col will be referred to as a reference motion information acquisition position hereinafter. FIGS. 13A, 13B, 13C, 13D, 13E, and 13F illustrate examples of the reference motion information acquisition position for each encoding target prediction unit size (32×32 to 16×16) when the reference position information 2560 indicates the center of the prediction unit in position Col. In FIGS. 13A, 13B, 13C, 13D, 13E, and 13F, each block indicates a 4×4 prediction unit, and a circle indicates the position of a 4×4 prediction unit to be acquired as the predicted motion information candidate 2755. FIGS. 14A, 14B, 14C, 14D, 14E, and 14F illustrate other examples of the reference motion information acquisition position. Referring to FIGS. 14A, 14B, 14C, 14D, 14E, and 14F, no 4×4 prediction unit exists in the position of a circle, so the predicted motion information candidate 2755 is generated by a predetermined method such as the average or median of the reference motion information 2558 in four 4×4 prediction units adjacent to the circle. As still another example of the reference motion information acquisition position, the reference motion information 2558 of a 4×4 prediction unit positioned at the upper left corner of the prediction unit in position Col may also be used as the predicted motion information candidate 2755. In a case other than the abovementioned examples, it is possible to generate the predicted motion information candidate 2755 by using any position and any method, provided that the method is a predetermined method.

Note that if no reference motion information 2558 exists, the motion information 2559 having a zero vector is output as the predicted motion information candidate 2755.

By the processing described above, at least one predicted motion information candidate 2755 is output from the reference motion block. If the reference frame number of the aforementioned predicted motion information candidate 2755 is different from that of the encoding target prediction unit, the predicted motion information candidate 2755 can be scaled by using the reference frame number of the predicted motion information candidate 2755 and that of the encoding target prediction unit. The predicted motion information selection switch 2705 selects one of the plurality of predicted motion information candidates 2755 in accordance with the predicted motion information position 2754, and outputs the predicted motion information 952.

The inverse quantizer 2502 obtains a restored transform coefficient 2552 by inversely quantizing the quantized transform coefficient 2551 from the entropy decoder 2501. More specifically, the inverse quantizer 2502 performs inverse quantization in accordance with the information of quantization decoded by the entropy decoder 2501. The inverse quantizer 2502 outputs the restored transform coefficient 2552 to the inverse orthogonal transformer 2503.

The inverse orthogonal transformer 2503 performs, on the restored transform coefficient 2552 from the inverse quantizer 2502, inverse orthogonal transformation corresponding to orthogonal transformation performed on the encoding side, thereby obtaining a restored prediction error signal 2553. The inverse orthogonal transformer 2503 inputs the restored prediction error signal 2553 to the adder 2504.

The adder 2504 generates the decoded image signal 2554 by adding the restored prediction error signal 2553 to the corresponding predicted image signal 2556. The decoded image signal 2554 is processed by a deblocking filter (not shown) or Wiener filter (not shown), temporarily stored in the output buffer 2511 for an output image, and also saved in the reference image memory 2505 for a reference image signal 2555. The decoded image signal 2554 saved in the reference image memory 2505 is referred to, as the reference image signal 2555, for each frame or each field as needed by the inter-predictor 2506. The decoded image signal 2554 temporarily stored in the output buffer 2511 is output in accordance with an output timing managed by the decoding controller 2510.

The inter-predictor 2506 performs inter-prediction by using the reference image signal 2555 saved in the reference image memory 2505. More specifically, the inter-predictor 2506 acquires the motion information 2559 containing a motion difference (motion vector) between the prediction target block and reference image signal 2555 from the entropy decoder 2501, and generates an inter-predicted image by performing interpolation (motion compensation) based on this motion vector. The generation of the inter-predicted image is the same as that in the first embodiment, so a repeated explanation will be omitted.

The decoding controller 2510 controls each element of the image decoding apparatus shown in FIG. 25. More specifically, the decoding controller 2510 outputs the reference position information 2560 (to be described later) to the entropy decoder 2501, and performs various kinds of control for the decoding process including the above-described operations.

<Explanation of Skip Mode, Merge Mode, and Inter Mode>

The image decoding apparatus 2500 according to this embodiment uses a plurality of prediction modes using different decoding processes, as shown in FIG. 8. Referring to FIG. 8, the skip mode is a mode that decodes only a syntax pertaining to the predicted motion information position 2754 (to be described later), and does not decode any other syntaxes. The merge mode is a mode that decodes only a syntax pertaining to the predicted motion information position 2754 and the transform coefficient information 2551, and does not decode any other syntaxes. The inter mode is a mode that decodes a syntax pertaining to the predicted motion information position 2754, the differential motion information 2753 (to be described later), and the transform coefficient information 2551. These modes are switched by the prediction information 2571 controlled by the decoding controller 2510.

Also, the image decoding apparatus shown in FIG. 25 uses syntaxes that are the same as or similar to the syntaxes explained with reference to FIG. 22, so a detailed explanation thereof will be omitted.

<Details of Motion Information Compressor 2508>

Next, the motion information compressor 2508 will be explained with reference to the flowchart shown in FIG. 16. When a process of decoding a frame (or an arbitrary unit such as a slice or coding unit) is complete, the motion information compressor 2508 compresses the motion information 2559 and stores the motion information 2559 in the temporal-domain reference motion information memory 502.

First, the reference position information 2560 is acquired from the decoding controller 2510 (step S1601), and a frame is divided into motion information compression blocks as compression units of the motion information 2559 (step S1602). The motion information compression block is a pixel block larger than a unit (typically, a block of 4×4 pixels) by which the motion information 2559 is stored by the motion compensation process, and is typically a block of 16×16 pixels. The motion information compression block may also be a block of 32×32 pixels, a block of 8×8 pixels, a rectangular pixel block, or a pixel region having an arbitrary shape.

Then, a representative motion information position is generated in accordance with the reference position information 2560 (step S1603). As an example of generating a representative motion information position, when the motion information compression block is a block of 16×16 pixels, the reference motion information acquisition position when the prediction unit size is 16×16, as shown in FIGS. 13D, 14D, and 17D, is set as the representative motion information position. Subsequently, the reference motion information 2558 of the generated representative motion information position is set as representative motion information (step S1604), and the representative motion information is stored in the temporal-domain reference motion information memory (step S1605). Steps S1604 and S1605 described above are executed for all motion information compression blocks.

When the unit for storing the motion information 2559 is an M×M block and the size of the motion information compression block is N×N (N is a multiple of M), the capacity of the reference motion information memory can be reduced to (M×M)/(N×N) by executing the aforementioned motion information compression process.

<Other Embodiments of Representative Motion Information Position>

As another example of generating a representative motion information position, the central position of a plurality of reference motion information acquisition positions may also be used as the representative motion information position. FIGS. 18A and 18B show the representative motion information position of each motion compression block having a size of 16×16. FIG. 18A shows representative motion information positions when reference motion information acquisition positions are the positions shown in FIG. 13D. Likewise, FIG. 18B shows representative motion information positions when reference motion information acquisition positions are the positions shown in FIG. 17D. Symbols ● in FIGS. 18A and 18B indicate reference motion information acquisition positions when a prediction unit is a 16×16 block. A representative motion information position indicated by x is placed in the central position (also called the barycentric position) of four reference motion information acquisition positions.

As still another example of generating a representative motion information position, it is also possible to use a reference motion information acquisition position for each size of a plurality of prediction units as the reference position information 2560, and generate a representative motion information position from a plurality of reference motion information acquisition positions. FIG. 19 shows the center (reference motion information acquisition position) of each prediction unit having a prediction unit size of 16×16 or more when a tree block is a block of 64×64 pixels.

As another example of generating a representative motion information position, a representative motion information position can also be set by using a reference motion information acquisition position set for each motion information compression block. FIG. 20A shows an example when the barycenter of a plurality of reference motion information acquisition positions in each motion information compression block is set as a representative motion information position. If the barycentric position does not match the position of a 4×4 block, it is possible to set the nearest 4×4 block as a representative motion information position, or generate the reference motion vector 166 of the barycentric position by using interpolation such as bi-linear interpolation.

FIG. 20B shows an example in which one of a plurality of reference motion information acquisition positions is selected for each motion information compression block, and set as a representative motion information position.

Furthermore, FIGS. 21A and 21B illustrate examples when motion information compression blocks have the same reference motion information acquisition position in a tree block. Since all motion information compression blocks have the same representative motion information position, representative motion information positions need not be switched in accordance with a position in the tree block. The representative motion information position need not be any of those shown in FIGS. 21A and 21B. The representative motion information position can be any position such as the upper left corner or upper right corner in the motion information compression block.

As an example of generating a representative motion information position, a representative motion information position may also be indicated by using BlkIdx indicating positions of 4×4 blocks in a motion information compression block in Z-scan order. When the size of the motion information compression block is 16×16, the representative motion information position, as shown in FIG. 21A, is equivalent to the position of BlkIdx=12. Also, the representative motion information position, as shown in FIG. 21B, is equivalent to the position of BlkIdx=15.

As another example of the motion information compression process, the motion information compression process may also include reference frame numbers in order to reduce the memory capacity for reference frame numbers. In this case, a reference frame number stored in a representative motion information position is stored in the memory capacity for reference frame numbers. Accordingly, the spatial-domain reference motion information memory 501 and spatial-domain reference motion information memory 502 shown in FIG. 5 store reference frame numbers in addition to the motion vector information.

As still another example of the motion information compression process, when the motion information compression process does not include any reference frame number, motion vector information in motion information in a representative motion information position can be scaled by using a reference frame number, and stored in the motion information memory 110. A typical example of the scaling process is a linear scaling process based on reference frame number zero. That is, if the reference frame number is not zero, the linear scaling process is performed such that the motion vector information refers to a reference frame corresponding to reference frame number zero. The basis of the above-described scaling process may also be a value other than reference frame number zero. If division occurs when performing the above-described linear scaling process, this division can be implemented by looking up a division process table formed beforehand.

When the motion information compression block is not a 16×16 block, a representative motion information position is generated by using the same processing as described above. As an example, when the size of the motion information compression block is 64×64, a reference motion information acquisition position in a 64×64 prediction unit is set as a representative motion information position. As another example, a representative motion information position in the 16×16 motion information compression block shown in, for example, FIGS. 21A and 21B can be scaled in the horizontal and vertical directions in accordance with the motion information compression block size, and the scaled position can be set as a representative motion information position.

If no reference motion information exists because a representative motion information position is outside a picture or slice, a position where reference motion information can be acquired in a motion information compression block, for example, the upper left corner of the motion information compression block can be set as a new representative motion information position. Also, if no reference motion information exists because a representative motion information position is a region to which intra-prediction is applied, a new representative motion information position can be set by executing the same processing.

Modifications of each embodiment will be explained below.

In each of the first and second embodiments, an example in which a frame is divided into rectangular blocks having a size of, for example, 16×16 pixels and encoding or decoding is performed in order from the upper left block to the lower right block on a screen has been explained (see FIG. 2A). However, the encoding order and decoding order are not limited to this example. For example, encoding and decoding may also be performed in order from the lower right block to the upper left block, or spirally performed from the center to the edges of a screen. Furthermore, encoding and decoding may also be performed in order from the upper right block to the lower left block, or spirally performed from the edges to the center of a screen.

The first and second embodiments have been explained by showing prediction target block sizes such as a block of 4×4 pixels, a block of 8×8 pixels, and a block of 16×16 pixels as examples, but a prediction target block need not have a uniform block shape. For example, the prediction target block (prediction unit) size can also be a block of 16×8 pixels, a block of 8×16 pixels, a block of 8×4 pixels, or a block of 4×8 pixels. Also, all block sizes need not be the same in one coding tree unit, and a plurality of different block sizes can coexist. When a plurality of different block sizes coexist in one coding tree unit, a code amount for encoding or decoding division information increases as the number of divided blocks increases. Therefore, a block size is desirably selected by taking account of the balance between the code amount of division information and the quality of a locally decoded image or decoded image.

In the first and second embodiments, a comprehensive explanation has been described for color signal components without distinguishing between a luminance signal and color difference signals for the sake of simplicity. However, when different prediction processes are used for a luminance signal and color difference signals, it is possible to use the same prediction method or different prediction methods. When different prediction methods are used for a luminance signal and color difference signals, a prediction method selected for the color difference signals can be encoded or decoded by the same method as that for the luminance signal.

In the first and second embodiments, a comprehensive explanation has been described for color signal components without distinguishing between a luminance signal and color difference signals for the sake of simplicity. However, when different orthogonal transformation processes are used for a luminance signal and color difference signals, it is possible to use the same orthogonal transformation method or different orthogonal transformation methods. When different orthogonal transformation methods are used for a luminance signal and color difference signals, an orthogonal transformation method selected for the color difference signals can be encoded or decoded by the same method as that for the luminance signal.

In the first and second embodiments, a syntax element not defined in the embodiments can be inserted between lines of the table indicating the syntax configuration, or another description pertaining to conditional branch may also be included. It is also possible to divide the syntax table into a plurality of tables, or integrate a plurality of tables into one table. Furthermore, it is not always necessary to use the same language, and freely change the language in accordance with a use form.

As has been explained above, each embodiment can implement efficient orthogonal transformation and inverse orthogonal transformation while reducing the complexity in a hardware package and software package. Accordingly, each embodiment increases the encoding efficiency and improves the subjective image quality.

Also, the instructions indicated by the procedures explained in the above-described embodiments can be executed based on a program as software. A general-purpose computer system can obtain effects similar to those of the image encoding apparatus and image decoding apparatus of the above-described embodiments by prestoring the program and reading it. The instructions described in the abovementioned embodiments are recorded, as a program executable by a computer, on a magnetic disk (for example, a flexible disk or hard disk), an optical disk (for example, a CD-ROM, CD-R, CD-RW, DVD-ROM, DVD±R, or DVD±RW), a semiconductor memory, or a recording medium of this kind. The storage format of the recording medium can take any form, provided that the medium can be read by a computer or an embedded system. The computer can implement the same operations as those of the image encoding apparatus and image decoding apparatus of the above-described embodiments by reading the program from the recording medium, and causing a CPU to execute, based on the program, the instructions described in the program. The computer can, of course, also acquire or read the program across a network.

In addition, based on the instructions of the program installed in the computer or embedded system from the recording medium, an operating system (OS) running on the computer, database management software, or middleware (MW) of the network or the like can execute a part of each processing for implementing the embodiments.

Furthermore, the recording medium according to the embodiments is not limited to a medium independent of the computer or embedded system, and includes a recording medium storing or temporarily storing the program transmitted across a LAN or the Internet and downloaded. It is also possible to store the program for implementing the process of each embodiment in a computer (server) connected to a network such as the Internet, and download the program to a computer (client) across the network.

Also, the recording medium is not restricted to one. Even when the process of each embodiment is executed from a plurality of media, these media are included in the recording medium according to the embodiments, and the media can take any form.

Note that the computer or embedded system according to the embodiments is used to execute each process of the embodiments based on the program stored in the recording medium, and can be, for example, a single apparatus such as a personal computer or microcomputer, or a system obtained by connecting a plurality of apparatuses across a network.

Note also that the computer according to the embodiments is not limited to a personal computer, and includes a processing unit or microcomputer incorporated into an information processing apparatus. That is, the computer is a general term of an apparatus and device capable of implementing the functions of the embodiments based on the program.

Functional configurations of the image encoding apparatus and the image decoding apparatus according to each of the embodiments have been described with reference to the drawings. The functional configurations are implemented by hardware configurations, for example, as will be described below.

An example of the hardware configurations of the image encoding apparatus and the image decoding apparatus according to each of the embodiments will be described with reference to FIG. 28. The image encoding apparatus and the image decoding apparatus each comprise a control unit 2801, such as a CPU (Central Processing Unit) which controls the overall apparatus, a main storage 2802, such as a ROM (Read Only Memory) or a RAM (Random Access Memory) which stores various data or programs, an auxiliary storage 2803, such as an HDD (Hard Disk Drive) or a CD (Compact Disk) drive which stores various data or programs, and a bus connecting these elements. This is a hardware configuration utilizing a conventional computer. Further, the image encoding apparatus and the image decoding apparatus are connected wirelessly or through a wire to a communication I/F (Interface) 2804 which controls communication with an external apparatus, a display 2805 which displays information, and an operating unit 2806, such as a keyboard or a mouse which receives instructions input by the user. Data to be encoded and data to be decoded may be stored in the HDD, or input by the disk drive apparatus, or input externally via the communication I/F 2804.

Figure 28:
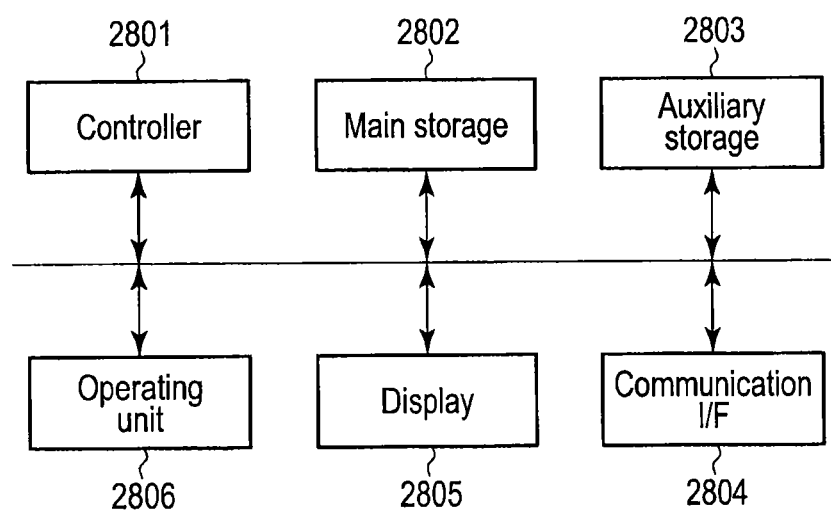
FIG. 28 is a view showing an example of a hardware configuration of an image encoding apparatus and an image decoding apparatus according to each of the embodiments.

The hardware configuration shown in FIG. 28 is a mere example. The image encoding apparatus and the image decoding apparatus of each embodiment may be implemented partly or entirely by an integrated circuit such as an LSI (Large Scale Integration) circuit or an IC (Integrated Circuit) chip set. The functional blocks of the image encoding apparatus and the image decoding apparatus may be individually formed of a processor, or may be integrated partly or entirely as a processor. Integration of the circuits of the configuration is not limited to LSI, but may be implemented as a dedicated circuit or a general-purpose processor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A method performed at least partially by electronic circuitry, comprising:
    inputting encoded data comprising at least a target block in a first picture;
    decoding a merge flag specifying whether at least a motion vector of an inter prediction mode is inferred from a merging block;
    deriving a first candidate motion vector from at least one neighboring block of the target block in the first picture, when the merge flag specifies that at least the motion vector of the inter prediction mode is inferred from the merging block, wherein the at least one neighboring block of the target block comprises at least one of a block on bottom left side of the target block, a block on left side of the target block, a block on upper right side of the target block, a block on upper side of the target block, and a block on upper left side of the target block;
    deriving a second candidate motion vector from a representative motion vector of a representative position of a collocated block in a second picture different from the first picture, when the merge flag specifies that at least the motion vector of the inter prediction mode is inferred from the merging block, wherein candidates of the representative position are determined according to a center position of the target block or a corner position of the target block, and if one of candidates of the representative position is outside of the second picture, another one of candidates of the representative position is selected as the representative position;
    decoding a merge index specifying the merging block from the at least one neighboring block and the collocated block; and
    deriving a first motion vector for the target block from any one of the first candidate motion vector and the second candidate motion vector according to the merge index.

2. A method performed at least partially by electronic circuitry, comprising:
    inputting data comprising at least a target block in a first picture;
    determining a merge flag specifying whether at least a motion vector of an inter prediction mode is inferred from a merging block;

determining a first candidate motion vector from at least one neighboring block of the target block in the first picture, when the merge flag specifies that at least the motion vector of the inter prediction mode is inferred from the merging block, wherein the at least one neighboring block of the target block comprises at least one of a block on bottom left side of the target block, a block on left side of the target block, a block on upper right side of the target block, a block on upper side of the target block, and a block on upper left side of the target block;

determining a second candidate motion vector from a representative motion vector of a representative position of a collocated block in a second picture different from the first picture, when the merge flag specifies that at least the motion vector of the inter prediction mode is inferred from the merging block, wherein candidates of the representative position are determined according to a center position of the target block or a corner position of the target block, and if one of candidates of the representative position is outside of the second picture, another one of candidates of the representative position is selected as the representative position;

determining a merge index specifying the merging block from the at least one neighboring block and the collocated block; and determining a first motion vector for the target block from any one of the first candidate motion vector and the second candidate motion vector according to the merge index, wherein the merge flag and the merge index are encoded.

\* \* \* \* \*